(12) United States Patent
Kaigawa et al.

(10) Patent No.: US 7,621,979 B2
(45) Date of Patent: Nov. 24, 2009

(54) CARBON FILM LAMINATE AND METHOD FOR PRODUCTION THEREOF, AND VOC REMOVING DEVICE

(75) Inventors: Kazuyuki Kaigawa, Nishikasugai-Gun (JP); Toshihiro Tomita, Nagoya (JP); Manabu Yoshida, Bisai (JP); Masamichi Obata, Chita-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 457 days.

(21) Appl. No.: 11/511,204

(22) Filed: Aug. 28, 2006

(65) Prior Publication Data

US 2006/0288677 A1    Dec. 28, 2006

Related U.S. Application Data

(63) Continuation of application No. PCT/JP2005/004866, filed on Mar. 11, 2005.

(30) Foreign Application Priority Data

Mar. 12, 2004  (JP)  ............... 2004-071187
Mar. 23, 2004  (JP)  ............... 2004-083818

(51) Int. Cl.
*B01D 53/22* (2006.01)
*B01D 69/12* (2006.01)
*B01D 71/02* (2006.01)

(52) U.S. Cl. .................. 95/50; 95/54; 96/11; 364/29.1; 364/41

(58) Field of Classification Search .......... 96/11, 96/12; 95/43, 47, 50, 54; 210/500.21; 502/4; 55/523, 524; 264/29.1, 41
See application file for complete search history.

(56) References Cited

U.S. PATENT DOCUMENTS

| | | | | |
|---|---|---|---|---|
| 4,685,940 A | * | 8/1987 | Soffer et al. | 96/8 |
| 4,919,860 A | * | 4/1990 | Schindler et al. | 264/29.1 |
| 5,507,860 A | * | 4/1996 | Rao et al. | 96/12 |
| 5,695,818 A | * | 12/1997 | Soffer et al. | 427/248.1 |
| 5,810,912 A | | 9/1998 | Akiyama et al. | |
| 5,972,079 A | * | 10/1999 | Foley et al. | 96/11 |
| 6,503,295 B1 | | 1/2003 | Koros et al. | |
| 2004/0237779 A1 | * | 12/2004 | Ma et al. | 95/55 |

FOREIGN PATENT DOCUMENTS

| | | |
|---|---|---|
| EP | 0 459 623 A1 | 12/1990 |
| JP | 04-011933 A1 | 1/1992 |
| JP | 04-193334 | 7/1992 |
| JP | 04-326930 A1 | 11/1992 |
| JP | 05-220360 | 8/1993 |

(Continued)

*Primary Examiner*—Frank M Lawrence
(74) *Attorney, Agent, or Firm*—Burr & Brown

(57) ABSTRACT

A carbon film laminate 1 having a porous substrate 6 formed of a plurality of particles and a carbon film 2 provided on a surface of the porous substrate 6, wherein the porous substrate 6 includes a surface layer 3 which is in contact with the carbon film 2 and which is formed of particles 3a having a mean particle size of 0.01 to 0.11 μm, and a porous body 5 formed of particles having a mean particle size differing from that of the particles 3a forming the surface layer 3. The invention provides a carbon film laminate which does not generate cracks and pinholes of the carbon film and which is suitable for producing thin film thereof.

22 Claims, 9 Drawing Sheets

FOREIGN PATENT DOCUMENTS

| | | | |
|---|---|---|---|
| JP | 08-299769 A1 | 11/1996 |
| JP | 10-052629 | 2/1998 |
| JP | 2000-246075 A1 | 9/2000 |
| JP | 2002-066280 A1 | 3/2002 |
| JP | 2002-219344 A1 | 8/2002 |
| JP | 2002-293656 A1 | 10/2002 |
| JP | 2003-053167 A1 | 2/2003 |
| JP | 2003-286018 A1 | 10/2003 |
| WO | WO 01/034283 A1 | 5/2001 |

* cited by examiner

CARBON FILM LAMINATE AND METHOD FOR PRODUCTION THEREOF, AND VOC REMOVING DEVICE

TECHNICAL FIELD

The present invention relates to a carbon film laminate and to a method for producing the same, and more particularly, to a carbon film laminate which does not generate cracks and pinholes of the carbon film and which is suitable for producing thin film thereof and to a method for producing the laminate. The present invention also relates to a method for producing a carbon film laminate, through which a carbon film laminate including a carbon film having a desired pore size can be produced conveniently, and to a carbon film laminate which is suitable for separation/concentration of oxygen from air and for reducing VOC concentration of air containing a volatile organic compound (VOC).

BACKGROUND OF THE INVENTION

Currently, one promising method for separating and recovering a specific gas from a gas mixture for effective utilization of the gas is separation by means of carbon film. As compared with ceramic film and zeolite film, the carbon film, which is generally produced by pyrolyzing polymer material film at high temperature so as to carbonize the film, has excellent heat resistance and is unlikely to provide defects during a film formation step.

One such carbon film heretofore disclosed is produced through carbonization of an aromatic polyimide asymmetric hollow fiber membrane (see, for example, Patent Documents 1 to 3). A method for producing a carbon molecular sieve film is also disclosed in literature (see, for example, Patent Document 4). In the method, a thermosetting resin liquid is applied onto a surface of a ceramic porous body to thereby form a polymer film, and the assembly is heated in a non-oxidizing atmosphere, whereby a molecular sieve film is produced.

In one proposed approach to attain a satisfactory permeation rate and separation factor simultaneously, a carbon film is formed on a porous substrate from an aromatic polyimide resin having a specific structure, serving as a precursor for carbon film (see, for example, Patent Document 5).

Generally, when the aforementioned separation membrane is employed for selective permeation of gas or other substances, permeation rate decreases as the separation factor to be attained increases. Separation factor and permeation rate of carbon film are regulated through selection of decomposition conditions of the precursor resin therefor or through other factors. Hitherto, separation factor and permeation rate of carbon film have not been balanced at a satisfactory level. In contrast, the approach proposed in Patent Document 5 is that a carbon film provided on a porous substrate is produced from an aromatic polyimide resin having a specific structure serving as a precursor for carbon film, so as to attain satisfactory permeation rate and separation factor. The carbon film disclosed in Patent Document 5 is excellent in satisfying high-level permeation rate and separation factor. However, when the thickness of the carbon film is further decreased in order to elevate permeation rate, separation factor may fail to increase.

Patent Document 1: Japanese Patent Application Laid-Open (kokai) No. 4-11933
Patent Document 2: Japanese Patent Application Laid-Open (kokai) No. 4-193334
Patent Document 3: Japanese Patent Application Laid-Open (kokai) No. 5-220360
Patent Document 4: Japanese Patent Application Laid-Open (kokai) No. 10-52629
Patent Document 5: Japanese Patent Application Laid-Open (kokai) No. 2003-286018

The aforementioned carbon film produced from a specific aromatic polyimide resin serving as a precursor per se is an excellent material. However, when the thickness of the carbon film is further reduced, irregularities present on the porous substrate surface on which the carbon film is disposed interact with the thin film, thereby impairing separation factor. In other words, reducing the film thickness results in irregularities present on the porous substrate surface having a height larger than the film thickness. For example, when a protrusion having a height greater than the film thickness is present, a portion of the film corresponding to the protrusion is excessively thinned, possibly generating pinholes and cracks. Such phenomenon may inhibit enhancement of separation factor.

In the above-proposed method, a polyimide resin precursor is applied onto a surface of the porous substrate, the precursor is converted to polyimide, and the polyimide film is carbonized, to thereby form a carbon film. In this case, the polyimide resin precursor which has been applied onto the porous substrate surface enters dented portions and spaces defined by particles forming the porous substrate. Thus, when the total volume of irregularities present in the surface of porous substrate is relatively large with respect to the volume of the polyimide resin precursor applied (i.e., when the particles forming the porous substrate have a larger mean particle size), the areas of the film corresponding to the irregularities may be thinner or accompanied with pinholes and cracks.

Meanwhile, a carbon film laminate is suitably employed for gas separation. In order to effectively separate a specific gas species from a gas mixture, controlling the pore size of the carbon film is essential. However, currently, methodology for controlling the pore size has not yet been fully studied. Hitherto, there has never been produced a carbon film laminate having a pore size which removes VOC—a problematic compound recognized in recent years—from air at high efficiency.

SUMMARY OF THE INVENTION

The present invention was conceived to overcome the aforementioned problems involved in conventional techniques. Thus, the present invention provides a carbon film laminate which does not generate cracks and pinholes of the carbon film and which is suitable for producing thin film thereof, as well as a method for producing the carbon film laminate. The invention also provides a VOC-removing apparatus employing the carbon film laminate.

The present invention further provides a carbon film laminate, through which a carbon film laminate including a carbon film having a desired pore size can be suitably produced, and a carbon film laminate including a carbon film having a predetermined pore size.

The carbon film laminate, the method for producing the same, and the VOC-removing apparatus of the present invention are specified below.

[1] A carbon film laminate having a porous substrate formed of a plurality of particles and a carbon film provided on a surface of the porous substrate, wherein the porous substrate comprises a surface layer which is in contact with the carbon film and which is formed of particles having a mean particle size of 0.01 to 0.11 µm, and a porous body formed of particles having a mean particle size differing from that of the particles forming the surface layer (hereinafter the carbon film laminate may be referred to as "first mode of the carbon film laminate of the present invention").

[2] A carbon film laminate as described in [1], wherein the surface layer of the porous substrate has a thickness of 0.5 to 2.5 μm.

[3] A carbon film laminate as described in [1] or [2], wherein the carbon film has a thickness of 0.1 to 5 μm.

[4] A carbon film laminate as described in any of [1] to [3], wherein the particles forming the porous substrate are ceramic particles.

[5] A carbon film laminate as described in any of [1] to [4], wherein the particles forming the surface layer of the porous substrate contain titania particles.

[6] A carbon film laminate as described in any of [1] to [4], wherein the particles forming the surface layer of the porous substrate contain zirconia particles.

[7] A carbon film laminate as described in any of [1] to [6], which is able to perform oxygen/nitrogen separation of a gas containing oxygen and nitrogen.

[8] A carbon film laminate as described in any of [1] to [6], which allows a volatile organic compound (VOC) to be separated from air containing the VOC.

[9] A method for producing a carbon film laminate comprising
providing a surface layer on a surface of a porous body formed of a plurality of particles, the surface layer being formed of particles having a mean particle size of 0.01 to 0.11 μm and having a mean particle size differing from that of the particles forming the porous body, to thereby form a porous substrate having a porous body and a surface layer;
providing a polyimide resin layer on the surface layer of the porous substrate, to thereby form a porous substrate having a polyimide resin layer thereon (hereinafter referred to as "polyimide resin layer-provided porous substrate"); and
thermally treating the polyimide resin layer-provided porous substrate so as to carbonize polyimide resin, to thereby form a carbon film laminate (hereinafter the method for producing a carbon film laminate may be referred to as "first mode of the method for producing a carbon film laminate of the present invention").

[10] A method for producing a carbon film laminate as described in [9], wherein the polyimide resin layer-provided porous substrate is thermally treated in a non-oxidizing atmosphere at 460 to 800° C.

[11] A method for producing a carbon film laminate as described in [9], the carbon film laminate being able to perform oxygen/nitrogen separation of a gas containing oxygen and nitrogen, wherein the polyimide resin layer-provided porous substrate is thermally treated in a non-oxidizing atmosphere at 460 to 550° C.

[12] A method for producing a carbon film laminate as described in [9], the carbon film laminate allowing a volatile organic compound (VOC) to be separated from air containing the VOC, wherein the polyimide resin layer-provided porous substrate is thermally treated in a non-oxidizing atmosphere at 550 to 800° C.

[13] A method for producing a carbon film laminate comprising a step of thermally treating a polyimide resin layer-provided porous substrate having a porous substrate and a polyimide resin layer formed on the porous substrate, to thereby carbonize polyimide resin to form a carbon film, wherein the polyimide resin layer-provided porous substrate is thermally treated under such thermal treatment conditions that percent shrinkage of the polyimide resin after initiation of shrinkage is adjusted to a predetermined value on the basis of the relationship between percent shrinkage of the polyimide resin per se as determined after initiation of shrinkage during thermal treatment of the resin and thermal treatment conditions therefor, whereby the carbon film has a controlled pore size (hereinafter the method for producing a carbon film laminate may be referred to as "second mode of the method for producing a carbon film laminate of the present invention").

[14] A method for producing a carbon film laminate as described in [13], wherein thermal treatment is performed under such conditions that percent shrinkage is controlled to 3 to 15%.

[15] A method for producing a carbon film laminate as described in [13], wherein thermal treatment is performed under such conditions that percent shrinkage is controlled to 15 to 35%.

[16] A carbon film laminate which is produced through a production method as described in [14] and which enables separation of gas molecules having a molecular diameter of 0.3 to 0.4 nm (hereinafter the carbon film laminate may be referred to as "second mode of the carbon film laminate of the present invention").

[17] A carbon film laminate as described in [16], which is able to perform nitrogen molecule/oxygen molecule separation.

[18] A carbon film laminate as described in [17], which attains a nitrogen molecule/oxygen molecule separation factor of 1.5 or more.

[19] A carbon film laminate which is produced through a production method as described in [15] and which enables separation of gas molecules having a molecular diameter of 0.4 nm or less and those having a molecular diameter more than 0.4 nm.

[20] A carbon film laminate as described in [19], which allows a volatile organic compound (VOC) to be separated from air containing the VOC.

[21] A carbon film laminate having a porous substrate and a carbon film provided on a surface of the substrate, which exhibits a nitrogen molecule/oxygen molecule separation factor of 1.1 or less and a p-xylene/air separation factor of 2 or more.

[22] A carbon film laminate as described in [21], which allows a volatile organic compound (VOC) to be separated from air containing the VOC.

[23] A VOC removal apparatus for taking in air flow containing a volatile organic compound (VOC) and for discharging air flow having a reduced VOC concentration, which apparatus comprises a carbon film laminate as recited in [8], [20], or [22], or a carbon film laminate produced through a method as recited in [12] or [15] for producing a carbon film laminate, the carbon film laminate being provided for separating air containing the VOC into air having an increased VOC concentration (high-VOC air) and air having a reduced VOC concentration, and a refrigerating apparatus for liquefying the VOC present in the high-VOC air.

[24] A VOC storing method for storing a volatile organic compound, which method comprises employing a VOC storing apparatus having a container (storage container) for storing the VOC, a gas pipe for bringing the storage container into communication with outside air, and a carbon film laminate as recited in [8], [20], or [22], or a carbon film laminate produced through a method as recited in [12] or [15] for producing a carbon film laminate, the laminate being placed in the gas pipe, and storing the VOC in the storage container, while the VOC concentration of the gas discharged through the gas pipe from the storage container is reduced.

According to the first mode of the carbon film laminate of the present invention, a carbon film is provided on a surface of a porous substrate, and the porous substrate comprises a surface layer which is in contact with the carbon film and which is formed of particles having a mean particle size of 0.01 to 0.11 μm, and a porous body formed of particles having a mean particle size differing from that of the particles forming the surface layer. Therefore, the porous substrate has reduced surface roughness, and generation of cracks and pinholes can be prevented, even when the thickness of the carbon film is reduced.

According to the first mode of the method for producing a carbon film laminate of the present invention, the surface layer of the porous substrate is formed of particles having a mean particle size as small as 0.01 to 0.11 μm, and a polyimide resin layer is formed on the surface layer. The carbon film laminate is formed through carbonization of the polyimide resin. Therefore, irregularities present in the surface layer and interparticle spaces are decreased, and migration of polyimide resin into dented portions and cavities of the surface is prevented during provision of a polyimide resin layer on the surface layer, whereby the thickness of the carbon film can be maintained. Thus, cracks and pinholes of the carbon film can be prevented. In addition, since the surface layer has a small roughness, cracks and pinholes of the carbon film which would otherwise be formed due to protrusions can be prevented. Since the VOC removal apparatus for removing a volatile organic compound (VOC) from air containing the VOC includes the first mode carbon film laminate of the present invention, VOC removal performance can be enhanced. The invention also provides a container for storing a volatile organic compound (VOC storage container), which container can reduce the VOC concentration of a discharge gas.

According to the second mode of the method for producing a carbon film laminate of the present invention, a carbon film laminate including a carbon film having a desired pore size is suitably produced. According to the second mode of the carbon film laminate of the present invention, gas separation; e.g., nitrogen gas/oxygen gas separation, can be performed at high efficiency. Alternatively, VOC concentration of air containing VOC can also be reduced.

DESCRIPTION OF REFERENCE NUMERALS

1 . . . Carbon film laminate, 2 . . . Carbon film, 3 . . . Surface layer, 3a, 4a . . . Particles, 3b . . . Surface of the surface layer, 4 . . . Intermediate layer, 5 . . . Porous body, 6 . . . Porous substrate, 11 . . . Alumina tube, 12 . . . Carbon film, 13 . . . Tubular furnace, 14 . . . Tubular glass cell, 15 . . . Quartz tube, 16 . . . Xylene, 20 . . . Gas permeation test apparatus, 21 . . . Bubbler, 22 . . . Valve, 23 . . . Gas inlet, 24 . . . Porous substrate, 30 . . . Evaluation sample

DETAILED DESCRIPTION OF THE INVENTION

Best modes for Carrying Out the present invention (hereinafter may be referred to as "embodiment") will next be described with reference to the drawings. However, these embodiments should not be construed as limiting the invention thereto. It is also understood by those skilled in the art that appropriate changes and modifications in arrangement of the embodiments may be made in the invention without departing from the scope of the present invention.

Figure 1:
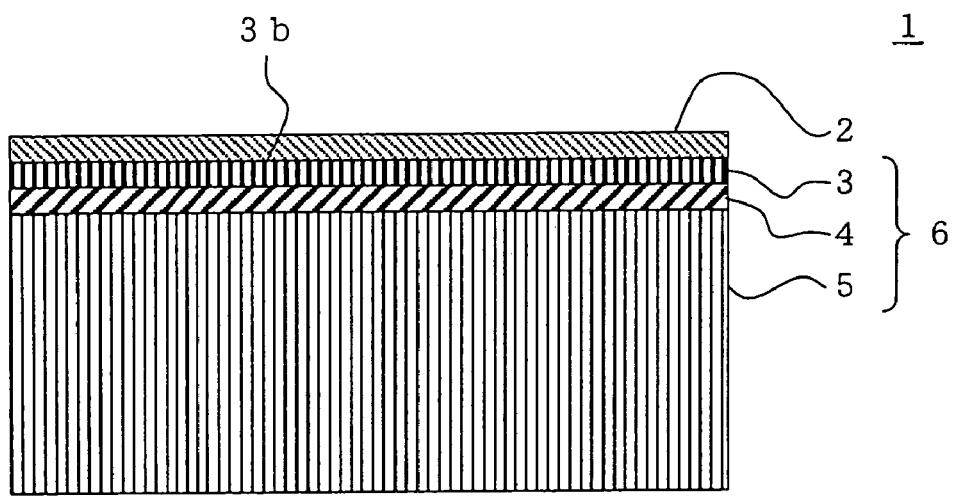
FIG. 1 is a schematic cross-sectional view of an embodiment of the carbon film laminate (first mode) of the present invention, as viewed from a cross-section obtained by perpendicularly cutting the carbon film.
Figure 2:
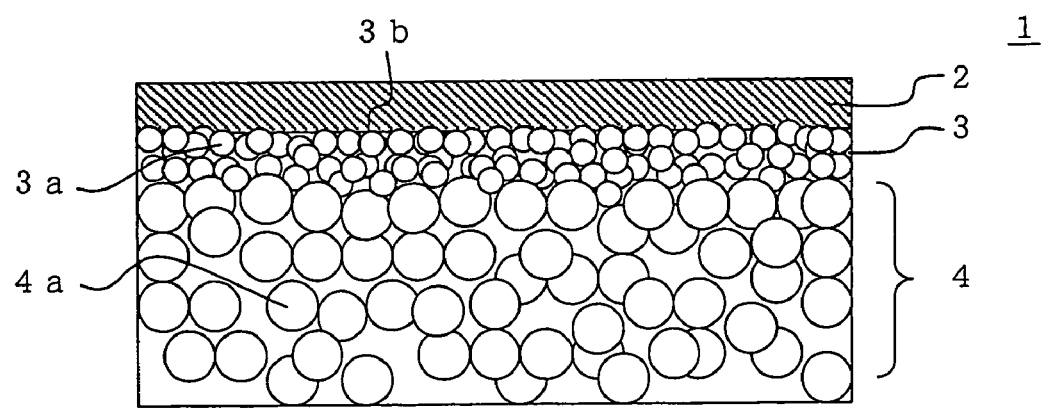
FIG. 2 is a schematic cross-sectional view of an embodiment of the carbon film laminate (first mode) of the present invention, as viewed from a cross-section obtained by perpendicularly cutting the carbon film, wherein the carbon film, a surface layer, and an intermediate layer are enlarged.

FIG. 1 is a schematic cross-sectional view of an embodiment of the carbon film laminate (first mode) of the present invention, as viewed from a cross-section obtained by perpendicularly cutting the carbon film. FIG. 2 is a schematic cross-sectional view of the embodiment, as viewed from a cross-section obtained by perpendicularly cutting the carbon film, wherein the carbon film, a surface layer, and an intermediate layer are enlarged. As shown in FIG. 1, the carbon film laminate of the embodiment has a porous substrate 6, and a carbon film 2 provided on a surface of the porous substrate 6. The porous substrate 6 is in contact with the carbon film 2 and includes a surface layer 3 formed of particles 3a having a mean particle size of 0.01 to 0.11 μm and a porous body 5 formed of particles having a mean particle size differing from that of the particles 3a forming the surface layer 3. In this embodiment, an intermediate layer 4 is provided on a surface of the porous body 5 serving as a support of the porous substrate 6, and the surface layer 3 is provided on a surface of the intermediate layer 4. In other words, the porous substrate 6 has a stacked structure of two or more layers. The porous substrate 6 is formed of a plurality of particles (not illustrated). Preferably, the mean particle size of the particles forming the intermediate layer 4 is smaller than that of the particles forming the porous body 5. As shown in FIG. 2, the mean particle size of the particles 3a forming the surface layer 3 is preferably smaller than that of particles 4a forming the intermediate layer 4.

As described above, in the carbon film laminate of this embodiment, the carbon film is provided on a surface of the porous substrate, and the porous substrate has a stacked structure of two or more layers. In the stacked structure, the surface layer (a layer being in direct contact with the carbon film) is formed of particles having a mean particle size as small as 0.01 to 0.11 μm. Thus, the surface of the porous substrate (the surface of the surface layer) has a reduced roughness, and generation of cracks and pinholes can be prevented, even when the thickness of the carbon film is reduced.

The surface layer of the porous substrate forming the carbon film laminate of the embodiment is a porous layer formed of particles having a mean particle size as small as 0.01 to 0.11 μm. When the particle size is smaller than 0.01 μm, the particles enter interparticle spaces present in the intermediate layer 4, thereby failing to form the surface layer 3, whereas when the particle size is in excess of 0.11 μm, problematic cracks and pinholes are generated when the thickness of the carbon film is reduced. The particles forming the surface layer preferably have a mean particle size of 0.01 to 0.11 μm, more preferably 0.02 to 0.11 μm.

The surface layer of the porous substrate preferably has a thickness of 0.5 to 2.5 μm, more preferably 0.5 to 2 μm, particularly preferably 0.5 to 1 μm. When the thickness is less than 0.5 μm, irregularities of the intermediate layer 4 may fail to be compensated completely, whereas when the thickness is in excess of 2.5 μm, gas permeation rate may decrease.

The particles forming the surface layer of the porous substrate are preferably ceramic particles. The ceramic particles are preferably those containing titania or zirconia. More preferably, titania content or zirconia content is 80% or more.

In the case in which the surface layer of the porous substrate is formed from titania particles or zirconia particles, permeation of polyamid acid applied onto the surface of the porous substrate into the porous substrate during formation of carbon film can be effectively prevented. This phenomenon is conceived to be attributed to wettability between surfaces of titania particles or zirconia particles and the polyimide resin precursor.

The aforementioned ceramic particles having a mean particle size of 0.01 to 0.11 μm may be produced through a solution process such as the sol-gel method.

The surface layer of the porous substrate preferably has a mean pore size of 0.005 to 0.05 μm, more preferably 0.01 to 0.05 μm. The porosity of the surface layer is preferably 20 to 55%, more preferably 25 to 40%.

As shown in FIG. 1, the porous substrate 6 forming the carbon film laminate 1 of the present embodiment has a tri-layer structure consisting of the porous body 5, the intermediate layer 4, and the surface layer 3. In the porous substrate 6, the intermediate layer 4 provided between the porous body 5 and the surface layer 3 may be a single layer or in the form of two or more layers. Alternatively, the intermediate layer may be absent. The porous body 5 forming the porous substrate 6 serves as a support sustaining the entirety of the carbon film laminate 1. On a surface of the porous body 5, the aforementioned intermediate layer 4 and the surface layer 3 are formed, and the carbon film 2 is formed on a surface 3b of the surface layer 3. By virtue of the porous body 5, the carbon film 2 has excellent mechanical strength.

The porous body is preferably formed of particles having a mean particle size of 1 to 100 μm, more preferably 3 to 60 μm. The porous body preferably has a mean pore size of 0.2 to 40 μm, more preferably 0.5 to 20 μm. The porosity of the porous body is preferably 20 to 55%, more preferably 25 to 40%. The particles forming the porous body are preferably ceramic particles, and examples of the ceramic material include alumina, silica, cordierite, zirconia, and mullite.

No particular limitation is imposed on the shape of the porous body (similarly, no particular limitation is imposed on the shape of the carbon film laminate). For example, the porous body has a disk-shape (not illustrated). Needless to say, a polygonal plate, a cylinder, a box-like cylinder, a rod, a square pillar, etc. may be selected in accordance with the purpose of use. No particular limitation is imposed on the dimensions of the porous body (similarly, no particular limitation is imposed on the dimensions of the carbon film laminate), and the dimensions may be selected in accordance with the purpose of use, so long as the dimensions assure sufficient strength of the support and ensure permeability of the gas to be subject to gas separation. For example, the porous body may be a disk ($\phi$: 150 mm) or a tube ($\phi$: 10 mm, length: 100 mm).

As shown in FIG. 2, particles 4a forming the intermediate layer 4 preferably have a mean particle size of 0.11 to 3 μm, more preferably 0.15 to 1 μm, particularly preferably 0.2 to 0.7 μm. The mean particle size of the particles 4a is preferably smaller than that of the particles forming the porous body 5. When the mean particle size of particles 4a forming the intermediate layer 4 is reduced, surface roughness of the surface layer 3 provided on a surface of the intermediate layer 4 is readily decreased. In other words, when the surface layer 3 formed of particles having a small mean particle size is provided directly on the porous body formed of particles having a large mean particle size, surface irregularities present in the surface of the porous body may be reflected on the surface layer 3. Therefore, the intermediate layer 4 provided between the porous body and the surface layer 3 and having an intermediate mean particle size serves as a layer for reducing the surface roughness of the surface layer 3. The intermediate layer 4 preferably has a mean pore size of 0.05 to 1 μm, more preferably 0.1 to 0.5 μm, and preferably has a porosity of 20 to 55%, more preferably 25 to 40%. The particles forming the intermediate layer are preferably ceramic particles, and examples of the ceramic include alumina, silica, cordierite, zirconia, and mullite.

The carbon film forming the carbon film laminate of the embodiment preferably has a thickness of 0.1 to 5 μm, more preferably 0.1 to 2.5 μm, particularly preferably 0.2 to 1 μm. When the thickness is 0.1 μm or less, separation factor (compositional ratio of permeated gas mixture/compositional ratio of fed gas mixture) during specific gas separation of the gas mixture through the carbon film decreases considerably, whereas when the thickness is in excess of 5 μm, permeation rate of the gas permeating carbon film may decrease.

The carbon film is preferably formed through carbonization of polyimide resin film. More preferably, the carbon film is formed through the following procedure:
applying, onto a surface of the porous substrate, a polyamic acid represented by the following formula (3):
(wherein X represents a tetravalent group selected from the group consisting of an aliphatic group, an alicyclic group, a single-ring aromatic group, a condensed-ring polycyclic aromatic group, and a non-condensed polycyclic aromatic group in which aromatic rings are linked directly or via a cross-linking member, each of the tetravalent group having C2 to C27; n is an integer of 5 to 10,000; Y represents a group represented by the following formula (2):
(wherein at least one phenylene group forming the main chain backbone is a m-phenylene group; Z represents a direct bond, —O—, —CO—, —S—, —SO$_2$—, —CH$_2$—, —C(CH$_3$)$_2$—, or —C(CF$_3$)$_2$—; m is an integer of 1 to 3; each of R$_{1-4}$ and R'$_{1-4}$ represents —H, —F, —Cl, —Br, —I, —CN, —CH$_3$, —CF$_3$, —OCH$_3$, phenyl, 4-phenylphenyl, phenoxy, or 4-phenylphenoxy; and R$_{1-4}$ and R'$_{1-4}$ may all be identical to or different from one another, or only some of them may be identical to one another)) and serving as a precursor for a polyimide resin represented by the following formula (1):
(wherein X and Y have the same definitions as defined above);
heating and drying the polyamic acid, to thereby form a polyimide resin film serving as a precursor for carbon film, whereby a polyimide resin layer-provided porous substrate is formed; and
pyrolyzing, in a non-oxidizing atmosphere, the polyimide resin of the formed polyimide resin layer-provided porous substrate, to thereby form a carbon film.

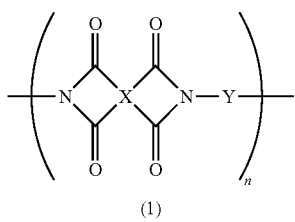

(1)

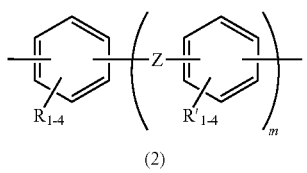

(2)

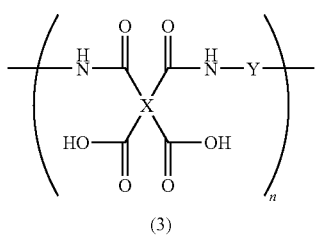

(3)

The carbon film laminate of the embodiment can be suitably employed in oxygen/nitrogen separation of a gas containing oxygen and nitrogen (e.g., air). In this case, the carbon film preferably has a mean pore size of 0.3 to 0.4 nm. Alternatively, the carbon film laminate of the embodiment can be suitably employed for separating a volatile organic compound (VOC) from air containing the same. In this case, the carbon film preferably has a mean pore size of 0.4 to 0.6 nm.

Next, an embodiment of the first mode of the method for producing a carbon film laminate of the present invention will be described.

The method for producing a carbon film laminate of the present embodiment includes
providing a surface layer on a surface of a porous body formed of a plurality of particles, the surface layer being formed of particles having a mean particle size of 0.01 to 0.11 μm and having a mean particle size differing from that of the particles forming the porous body, to thereby form a porous substrate having a porous body and a surface layer;
providing a polyimide resin layer on the surface layer of the porous substrate, to thereby form a polyimide resin layer-provided porous substrate; and
thermally treating the polyimide resin layer-provided porous substrate so as to carbonize polyimide resin, to thereby form a carbon film laminate. The mean particle size of the particles forming the surface layer is preferably smaller than that of the particles forming the porous body. On a surface of the porous body may be provided an intermediate layer which has a mean particle size smaller than that of the particles forming the porous body and has a mean particle size greater than that of the particles forming the surface layer. In this case, an intermediate layer is provided on a surface of the porous body, and a surface layer is provided on the intermediate layer, whereby a porous substrate is produced.

Thus, according to the method for producing a carbon film laminate of the present embodiment, the surface layer of the porous substrate is formed of particles having a mean particle size as small as 0.01 to 0.11 μm, and a polyimide resin layer is provided on the surface layer. The carbon film laminate is formed through carbonization of the polyimide resin. Therefore, irregularities present in the surface layer and interparticle spaces are decreased, and migration of polyimide resin into dented portions and cavities of the surface is prevented during provision of a polyimide resin layer on the surface layer, whereby the thickness of the carbon film can be maintained. Thus, cracks and pinholes of the carbon film can be prevented. In addition, since the surface layer has a small roughness, cracks and pinholes of the carbon film which would otherwise be formed due to protrusions can be prevented.

In the method for producing a carbon film laminate of the present embodiment, the porous body may be produced through a conventional ceramic manufacturing method. For example, a raw material having a predetermined composition is kneaded by means of a kneader, and the mixture is molded by means of a vacuum kneader, to thereby form green sheets or tubes. Through firing the green bodies, the porous bodies are produced.

In the case where an intermediate layer is provided between the porous body and the surface layer, an intermediate layer is provided on a surface of the produced porous body, the intermediate layer preferably being formed of particles having a mean particle size smaller than that of the particles forming the porous body. The intermediate layer is preferably produced through dispersing ceramic particles having a predetermined mean particle size in water, to thereby form a ceramic particle slurry; applying the slurry onto a surface of the porous body through spin-coating or a similar method; and drying and firing the slurry at a predetermined temperature for a predetermined time. Examples of preferred ceramic particle materials include alumina, silica, cordierite, zirconia, and mullite. The slurry concentration is preferably 20 to 80 mass %. No particular limitation is imposed on the slurry coating method, and spin coating, coating by suction filtration, or a similar method may be employed. No particular limitation is imposed on the conditions under which the slurry applied onto the surface of the porous body is dried, and the slurry is preferably dried at 90 to 200° C. for 0.5 to 5 hours. The dried slurry is preferably fired at 1,000 to 1,500° C. for 0.5 to 5 hours. The mean particle size of the particles forming the intermediate layer and the thickness, mean pore size, and porosity of the intermediate layer are preferably the same as employed for producing the intermediate layer serving as a member of the aforementioned carbon film laminate of the present invention.

After provision of the intermediate layer on a surface of the porous body, a surface layer is provided on the surface of the intermediate layer, whereby a porous substrate is produced. Preferably, a surface layer formed of particles having a mean particle size smaller than that of the particles forming the intermediate layer is provided on the surface of the thus-produced intermediate layer. The surface layer is preferably produced through dispersing ceramic particles having a predetermined mean particle size in water, to thereby form a ceramic particle slurry; applying the slurry onto the surface of the intermediate layer through spin-coating or a similar method; and drying and firing the slurry at a predetermined temperature for a predetermined time. Examples of preferred ceramic particle materials include titania and zirconia. The slurry concentration is preferably 1 to 50 mass %. No particular limitation is imposed on the slurry coating method, and spin coating, coating by suction filtration, or a similar method may be employed. No particular limitation is imposed on the conditions under which the slurry applied onto the surface of the intermediate layer is dried, and the slurry is preferably dried at 90 to 200° C. for 0.5 to 5 hours. The dried slurry is preferably fired at 400 to 1,500° C. for 0.5 to 10 hours. The mean particle size of the particles forming the surface layer and the thickness, mean pore size, and porosity of the surface layer are preferably the same as employed for producing the surface layer serving as a member of the aforementioned carbon film laminate of the present invention.

After production of the porous substrate, polyimide resin is provided on the surface of the porous substrate (the surface of the surface layer), to thereby produce a polyimide resin layer-provided porous substrate. In provision of the polyimide resin, polyamic acid serving as a precursor for polyimide resin is applied onto the surface of the porous substrate. In a preferred mode, polyamic acid is diluted with an organic solvent such as N,N-dimethylacetamide to 1 to 40 wt. %, and the diluted solution is applied onto the surface of the porous substrate through spin coating or a similar method. The polyamic acid provided on the surface of the porous substrate is heated at 90 to 300° C. for 0.5 to 60 hours, whereby a polyimide resin (carbon film precursor) layer-provided porous substrate is produced.

The thus-produced polyimide resin layer-provided porous substrate is thermally treated in a non-oxidizing atmosphere at 460 to 800° C. for 0.1 to 24 hours, so as to carbonize polyimide resin, to thereby produce a carbon film laminate.

The polyamic acid applied onto the porous substrate is preferably represented by formula (3) (wherein X represents a tetravalent group selected from the group consisting of a C2 to C27 aliphatic group, an alicyclic group, a single-ring aromatic group, a condensed-ring polycyclic aromatic group, and a non-condensed polycyclic aromatic group in which aromatic rings are linked directly or via a cross-linking member; n is an integer of 5 to 10,000; Y represents a group represented by formula (2) (wherein at least one phenylene group forming the main chain backbone is a m-phenylene group; Z represents a direct bond, —O—, —CO—, —S—, —$SO_2$—, —$CH_2$—, —$C(CH_3)_2$—, or —$C(CF_3)_2$—; m is an integer of 1 to 3; each of $R_{1-4}$ and $R'_{1-4}$ represents —H, —F, —Cl, —Br, —I, —CN, —$CH_3$, —$CF_3$, —$OCH_3$, phenyl, 4-phenylphenyl, phenoxy, or 4-phenylphenoxy; and $R_{1-4}$ and $R'_{1-4}$ may all be identical to or different from one another, or only some of them may be identical to one another) and serving as a precursor for a polyimide resin represented by formula (1) (wherein X and Y have the same definitions as defined above).

No particular limitation is imposed on the method of producing a polyamic acid employed in the present invention. The polyamic acid of the present invention may be produced by reacting a monomeric diamine represented by formula (4):

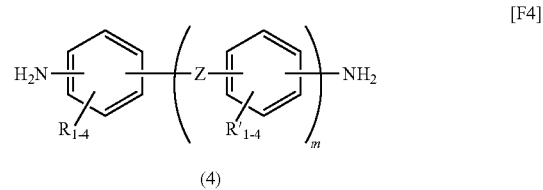

(wherein at least one of the phenylene groups connecting an amino group and Z and/or Z and Z is an m-phenylene group; Z represents a direct bond, —O—, —CO—, —S—, —$SO_2$—, —$CH_2$—, —$C(CH_3)_2$—, or —$C(CF_3)_2$—; m is an integer of 1 to 3; each of $R_{1-4}$ and $R'_{1-4}$ represents —H, —F, —Cl, —Br, —I, —CN, —$CH_3$, —$CF_3$, —$OCH_3$, phenyl, 4-phenylphenyl, phenoxy, or 4-phenylphenoxy; and $R_{1-4}$ and $R'_{1-4}$ may all be identical to or different from one another, or only some of them may be identical to one another) with a monomeric tetracarboxylic dianhydride represented by formula (5):

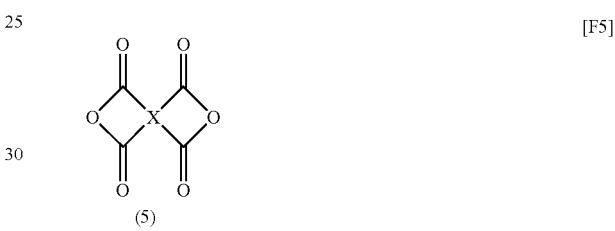

(wherein X represents a tetravalent group selected from the group consisting of a C2 to C27 aliphatic group, an alicyclic group, a single-ring aromatic group, a condensed-ring polycyclic aromatic group, and a non-condensed polycyclic aromatic group in which aromatic rings are linked directly or via a cross-linking member).

In the method of the embodiment for producing a carbon film laminate, when the polyimide resin layer-provided porous substrate is thermally treated in a non-oxidizing atmosphere at 460 to 550° C., the formed carbon film has a mean pore size of 0.3 to 0.4 nm. The carbon film is suitably employed for oxygen/nitrogen separation of a gas containing oxygen and nitrogen (e.g., air). When a carbon film laminate employed for oxygen/nitrogen separation is produced, the aforementioned thermal treatment is more preferably performed at 470 to 530° C., particularly preferably at 480 to 520° C. When the polyimide resin layer-provided porous substrate is thermally treated in a non-oxidizing atmosphere at 550 to 800° C., the formed carbon film has a mean pore size of 0.4 to 0.6 nm. The carbon film is suitably employed for separating a volatile organic compound (VOC) from air containing the VOC. When a carbon film laminate employed for separating VOC contained in air is produced, the aforementioned thermal treatment is more preferably performed at 580 to 750° C., particularly preferably at 600 to 700° C. Examples of preferred non-oxidizing atmospheres in which thermal treatment is performed include nitrogen, argon, and vacuum. Of these, a nitrogen atmosphere is more preferred, from the viewpoint of cost.

The second mode of the method for producing a carbon film laminate of the present invention includes a step of thermally treating a polyimide resin layer-provided substrate having a porous substrate and a polyimide resin layer formed on the porous substrate so as to carbonize polyimide resin, to thereby form a carbon film.

The present inventors have investigated in detail the relationship between the thermal treatment conditions and the pore size of the formed carbon film, and have found that the pore size varies in accordance with temperature and time of thermal treatment. From a more precise study, the inventors have further found that, when a polyimide resin film which is not attached to a porous substrate is thermally treated, the film exhibits thermal expansion to a predetermined temperature, then shrinkage. The inventors have also found that the percent shrinkage of polyimide resin itself is closely related to the pore size of the carbon film formed on the porous substrate.

Specifically, the inventors have found the following. When a polyimide resin layer formed on the porous substrate (hereinafter may be referred to as stacked resin film) is thermally treated under thermal treatment conditions where a polyimide resin film not attached to a substrate (hereinafter may be referred to as self-standing resin film) exhibits large percent shrinkage, the formed carbon film has a large pore size, whereas when the stacked resin film is thermally treated under conditions where percent shrinkage decreases, the formed carbon film has a smaller pore size.

The above phenomenon is conceived to be attributed to the following. Polyimide resin film thermally expands by heating. When carbonization starts, hydrogen and oxygen dissociate as gas components from the film, and the film starts shrinking. In the case of self-standing resin film, polyimide resin is not restricted and freely shrinks, whereas in the case of stacked resin film, polyimide resin is bound to the porous substrate, and the film cannot shrink. In this case, the film relaxes the stress by increasing the pore size.

Therefore, the relationship between percent shrinkage of a self-standing resin film after initiation of shrinkage caused by thermal treatment under predetermined conditions and the pore size of the carbon film formed through thermal treatment of a stacked resin film is investigated in advance, whereby a carbon film having a desired pore size can be readily produced.

Meanwhile, molecules such as oxygen and nitrogen have a molecular size less than about 1 nm, and a carbon film employed for separation thereof has an almost equivalent pore size. Thus, the pore size of the carbon film is difficult to accurately determine. Instead, for example, separation factor regarding two kinds of molecules having different molecular sizes is determined, and the value can be employed as an index for pore size of the carbon film.

However, determining pore size of carbon film under varied thermal treatment conditions such as temperature elevation rate, maximum temperature, maximum temperature retention time, and thermal treatment atmosphere is a very cumbersome task. In contrast, percent shrinkage of self-standing resin film can be readily determined. Therefore, once the relationship between the percent shrinkage and the pore size has been established, the pore size can be estimated through merely determination of percent shrinkage, even when thermal treatment conditions are modified in various manners, and the relationship between thermal treatment conditions and pore size can be readily derived. In addition, a percent shrinkage-time curve can be obtained through determination of percent shrinkage. Thus, percent shrinkage at every retention time can be obtained through a single determination trial, whereby the relationship between retention time and pore size can be established through a single determination trial, which is advantageous.

In the present invention, the time point at which shrinkage starts refers to a point at which expansion of a self-standing resin film during heating alters to shrinkage. Therefore, percent shrinkage after initiation of shrinkage means percent shrinkage with respect to the maximum expansion.

Thus, according to the second mode of method for producing a carbon film laminate of the present invention, a stacked resin film is thermally treated under such thermal treatment conditions that percent shrinkage of a self-standing resin film is controlled to attain a predetermined value, whereby a carbon film having a controlled predetermined pore size can be produced. For example, when a stacked resin film is thermally treated under such conditions that percent shrinkage of the self-standing film is controlled to 3 to 15%, the self-standing film can possess a pore size so as to substantially attain a molecular size of gas molecules of 0.3 to 0.4 nm. The carbon film laminate including a carbon film having such a pore size (the second mode of the carbon film laminate of the present invention) can be suitably employed for oxygen/nitrogen separation of a gas containing oxygen and nitrogen.

When a stacked resin film is thermally treated under such conditions that percent shrinkage of the self-standing film is controlled to 15 to 35%, the self-standing film can possess such a pore size that gas molecules having a molecular size of 0.4 nm or less and those having a molecular size more than 0.4 nm can be separated. The carbon film laminate including a carbon film having such a pore size can be suitably employed for separating VOC from air (oxygen molecules/nitrogen molecules mixture). Thus, through employment of such a carbon film, VOC concentration of air containing VOC can be reduced.

The second mode of the carbon film laminate employed for reducing VOC concentration preferably has a nitrogen (molecules)/oxygen (molecules) separation factor of 1.1 or less, more preferably substantially 1. The p-xylene/air separation factor is preferably 2 or higher, more preferably 5 or higher, particularly preferably 10 or higher. When a carbon film having a pore size so as to exhibit such a separation factor is employed, the target VOC is predominantly separated and no other components are separated from air, whereby VOC concentration of air containing VOC can be reduced.

As described above, the thermal treatment conditions may be selected in accordance with the purpose of use of the carbon film. The maximum temperature is generally 460 to 800° C., preferably 470 to 750° C., and thermal treatment is preferably performed in a non-oxidizing atmosphere such as nitrogen flow or helium flow.

No particular limitation is imposed on the material of the porous substrate serving as a support for carbon film. Examples of preferred materials include alumina, silica, cordierite, zirconia, and mullite. The porous substrate preferably has a porosity of about 20 to about 55% from the viewpoint of strength and permeability of the substrate, and preferably has a mean pore size of about 0.005 to about 1 µm. No particular limitation is imposed on the thickness of the porous substrate, and the thickness may be arbitrarily selected so long as the substrate satisfies a required strength and does not impair permeability of separation components. The shape of the substrate may be appropriately selected in accordance with the purpose of use of the carbon film.

In a preferred mode, a polyimide precursor solution is provided onto a surface of such a porous substrate through spin coating or a similar method, and the precursor is heated on the porous substrate, to thereby form polyimide.

No particular limitation is imposed on the type of polyimide resin so long as it can be carbonized by heat, and any polyimide resins known in the art can be employed. Of these, preferred is a polyimide resin having a repeating unit represented by formula (6):

[F6]

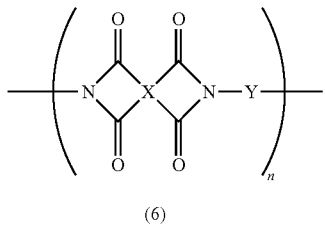

(6)

(wherein X represents a tetravalent group selected from the group consisting of a C2 to C27 aliphatic group, an alicyclic group, a single-ring aromatic group, a condensed-ring polycyclic aromatic group, and a non-condensed polycyclic aromatic group in which aromatic rings are linked directly or via a cross-linking member; n is an integer of 5 to 10,000; Y represents a group represented by formula (7):

[F7]

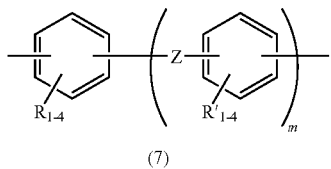

(7)

(wherein at least one phenylene group forming the main chain backbone is a m-phenylene group; Z represents a direct bond, —O—, —CO—, —S—, —SO$_2$—, —CH$_2$—, —C(CH$_3$)$_2$—, or —C(CF$_3$)$_2$—; m is an integer of 1 to 3; each of $R_{1-4}$ and $R'_{1-4}$ represents —H, —F, —Cl, —Br, —I, —CN, —CH$_3$, —CF$_3$, —OCH$_3$, phenyl, 4-phenylphenyl, phenoxy, or 4-phenylphenoxy; and $R_{1-4}$ and $R'_{1-4}$ may all be identical to or different from one another, or only some of them may be identical to one another). Also preferably, polyamic acid serving as a polyimide precursor and represented by formula (8):

[F8]

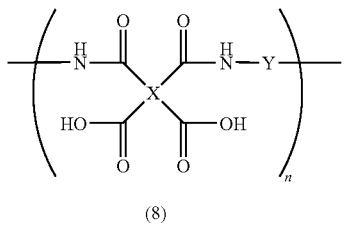

(8)

(wherein X and Y have the same definitions as defined in formulas (6) and (7)) is provided on a surface of the porous substrate, and the polyamic acid is heated to thereby form polyimide resin.

No particular limitation is imposed on the thickness of the carbon film formed on the porous substrate. However, when the thickness is excessively small, separation factor (compositional ratio of permeated gas mixture/compositional ratio of fed gas mixture) during specific gas separation of the gas mixture through the carbon film considerably decreases, whereas when the thickness is in excess of 5 µm, permeation rate of the gas permeating carbon film may decrease. The carbon film preferably has a thickness of 0.1 to 5 µm, more preferably 0.1 to 2.5 µm, particularly preferably 0.2 to 1 µm. Thus, the thickness of the polyimide resin layer is preferably adjusted so as to attain the above thickness of the carbon film.

In the aforementioned procedure, a polyimide resin layer-provided substrate including a porous substrate and a polyimide resin layer formed on the porous substrate is produced, and the polyimide resin layer is thermally treated in a non-oxidizing atmosphere under the thermal treatment conditions determined as described above, whereby the carbon film laminate of the second mode is produced.

In one embodiment of the VOC removal apparatus of the present invention, during use, air flow containing a volatile organic compound (VOC) is taken into the apparatus, and air flow having a reduced VOC concentration is discharged from the apparatus. The apparatus includes the carbon film laminate of the present invention for removing VOC from air and a refrigerating apparatus for liquefying VOC. In the VOC removal apparatus of the embodiment, VOC-containing air introduced to the apparatus is treated by means of a carbon film laminate provided in the apparatus, whereby air containing the VOC is separated into air having an increased VOC concentration (high-VOC air) and air having a reduced VOC concentration (low-VOC air). VOC contained in the thus-separated high-VOC air is liquefied by means of the refrigerating apparatus disposed in the VOC removal apparatus, whereas the thus-separated low-VOC air is discharged to the outside. The VOC removal apparatus may have a main pipe in which the carbon film laminate is provided, a discharge pipe for discharging low-VOC air from the main pipe to the outside, and a refrigerating apparatus pipe for introducing high-VOC air into the refrigerating apparatus. The above three pipes may be connected in line, form a multiple pipe (e.g., a dual pipe), or may be branched.

Removal and collection of VOC is an important issue from an environmental aspect. However, since VOC concentration of VOC-containing air is generally low, further reduction of the VOC concentration and collection of VOC impose high cost. For example, when VOC is liquefied and collected by means of only a refrigerating apparatus, the scale of the refrigerating apparatus must be increased. However, if VOC-containing air has been preliminary treated by means of the carbon film laminate of the invention so as to increase VOC concentration, liquefaction and collection of VOC can be performed by means of a small-scale refrigerating apparatus, whereby apparatus and operation costs can be reduced.

In the case where a volatile organic compound (VOC) is stored in a container, a gas pipe for bringing the container into communication with outside air is generally provided, whereby inside pressure of the storage container is controlled. When the inside pressure of the storage container increases, VOC-containing gas is discharged. In one embodiment of the method for storing VOC of the present invention, a VOC storing apparatus having a container for storing a volatile organic compound (VOC) (storage container), a gas pipe for bringing the storage container into communication with outside air, and the carbon film laminate of the present invention, the laminate being placed in the gas pipe, is employed. The method includes storing the VOC in the storage container and reducing the VOC concentration of the gas discharged through the gas pipe from the storage container. When the aforementioned carbon film laminate of the present invention is provided in the gas pipe, the carbon film laminate impedes permeation of VOC, whereby VOC concentration of the discharge gas discharged from the storage container can be reduced. When the inside pressure of the storage container decreases, outside air is introduced into the container through the carbon film laminate.

EXAMPLES

The present invention will next be described in more detail by way of examples, which should not be construed as limiting the invention thereto.

An embodiment of the first mode of the carbon film laminate of the present invention and an embodiment of the first mode of the method for producing the same will be described.

Example 1

Figure 3:
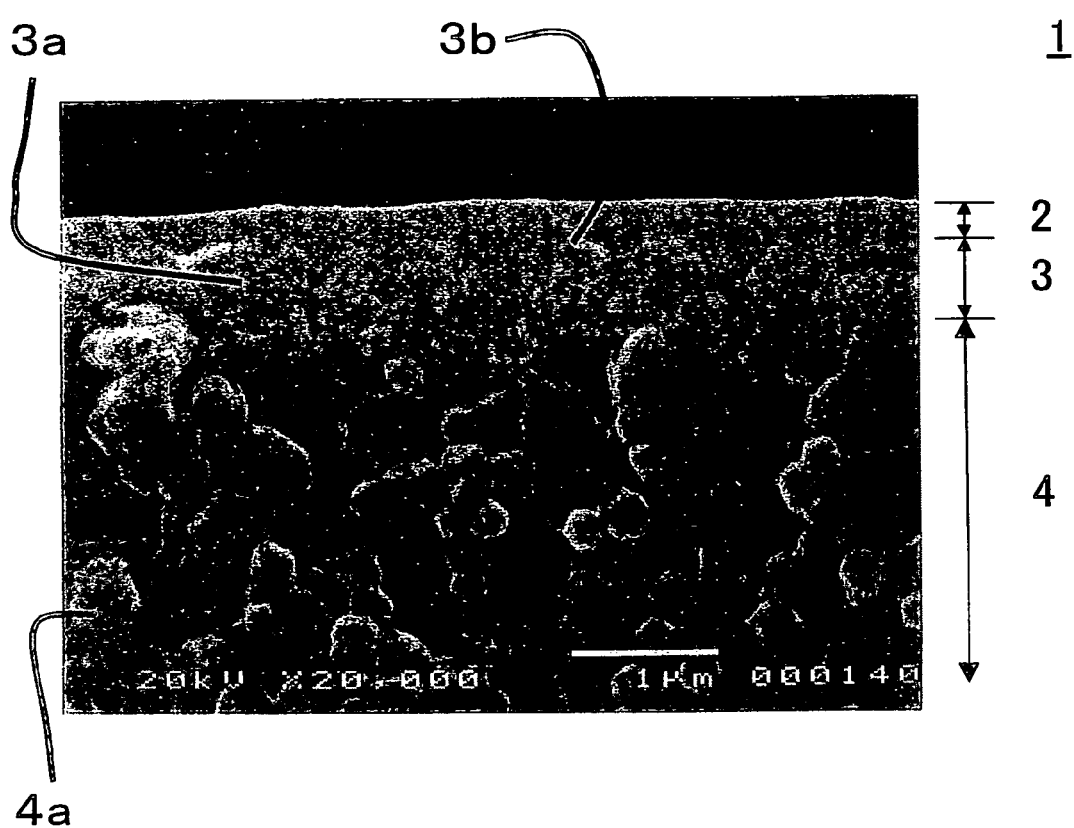
FIG. 3 is a photograph showing a cross-section of the carbon film laminate (first mode) of the present invention, taken under a scanning electron microscope in an Example.

A surface of a disk of porous alumina (product of NGK INSULATORS, LTD., mean particle size: 3 μm, mean pore size: 0.5 μm, φ: 14 mm, t=1.5 mm) was polished with sandpaper until the surface was visually observed to be flat, to thereby produce an alumina porous body. An alumina powder (AKP-15, product of Sumitomo Chemical Co., Ltd., mean particle size: 0.7 μm), ion-exchange water, and a dispersant (Aron A-6114, product of Toagosei Co., Ltd.) (3 wt. %) were mixed by means of an ultrasonic cleaning apparatus, to thereby form a 60 wt. % alumina slurry. The alumina slurry was applied onto the alumina porous body through spin coating, and the porous body was dried under atmospheric conditions at 150° C. for one hour and then fired in a box furnace under atmospheric conditions at 1,300° C. for two hours, whereby an alumina intermediate layer (A) (an intermediate layer-provided porous body) was produced. Separately, ion-exchange water was added to a 40 wt. % titania slurry (STS-21 (mean particle size: 20 nm), product of Ishihara Sangyo Kaisha, Ltd.), to thereby form a 4 wt. % titania slurry. The titania slurry was applied onto the alumina intermediate layer (A) through spin coating, and the porous body was dried under atmospheric conditions at 150° C. for one hour and then fired in a box furnace under atmospheric conditions at 500° C. for six hours, whereby a titania microparticle layer (a) (surface layer) was produced. Polyamic acid (PAA-Larc-TPI, product of Mitsui Chemicals, Inc.), which serves as a precursor for polyimide resin represented by formula (9), was diluted with N,N-dimethylacetamide, to thereby produce a polyamic acid solution (I) having a polyamic acid content of 10 wt. %. The polyamic acid solution was applied onto the titania microparticle layer (a) through spin coating, and thermally treated under atmospheric conditions at 90° C. for 30 minutes and 300° C. for one hour, to thereby provide a carbon film precursor on the titania miroparticle layer (a) (polyimide resin layer-provided porous substrate). The thus-produced polyimide resin layer-provided porous substrate was thermally treated in a box furnace (nitrogen atmosphere) at 520° C. for 6 hours, to thereby carbonize the carbon film precursor, whereby a carbon film laminate was yielded. In the thermal treatment, temperature elevation rate was regulated to 300° C./hour from room temperature to 300° C., and to 60° C./hour from 300° C. to 520° C., and temperature lowering rate was regulated to 100° C./hour from 520° C. to room temperature. FIG. 3 a photograph showing the cross-sectional microstructure of the thus-obtained carbon film laminate, as observed under a scanning electron microscope.

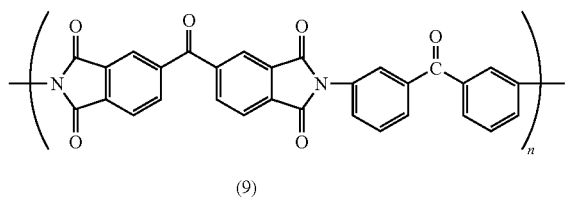

(9)

Example 2

In a manner similar to that employed in Example 1, a titania microparticle layer (a) (surface layer) was provided on an alumina intermediate layer (A). Specifically, a polyamic acid solution (I) in an amount three times that employed in Example 1 was applied onto the titania microparticle layer (a) through spin coating, and thermal treatment was performed in a manner similar to that employed in Example 1, to thereby form a carbon film precursor on the titania microparticle layer (a). The thus-formed carbon film precursor was thermally treated in a manner similar to that employed in Example 1, to thereby produce a carbon film laminate.

Example 3

A surface of a disk of porous alumina (product of NGK INSULATORS, LTD., mean particle size: 3 μm, mean pore size: 0.5 μm, φ: 14 mm, t=1.5 mm) was polished with sandpaper until the surface was visually observed to be flat, to thereby produce an alumina porous body. An alumina powder (AKP-50, product of Sumitomo Chemical Co., Ltd., mean particle size: 0.2 μm), ion-exchange water, and a dispersant (Aron A-6114, product of Toagosei Co., Ltd.) (3 wt. %) were mixed by means of a pot mill, to thereby form a 40 wt. % alumina slurry. The alumina slurry was applied onto the alumina porous body through spin coating, and the porous body was dried under atmospheric conditions at 150° C. for one hour and then fired in a box furnace under atmospheric conditions at 1,350° C. for two hours, whereby an alumina intermediate layer (B) (an intermediate layer-provided porous body) was produced. Separately, ion-exchange water was added to a 40 wt. % titania slurry (STS-21 (mean particle size: 20 nm), product of Ishihara Sangyo Kaisha, Ltd.), to thereby form a 4 wt. % titania slurry. The titania slurry was applied onto the alumina intermediate layer (B) through spin coating, and the porous body was dried under atmospheric conditions at 150° C. for one hour and then fired in a box furnace under atmospheric conditions at 500° C. for six hours, whereby a titania microparticle layer (a) (surface layer) was produced. A polyamic acid solution (I) in an amount twice that employed in Example 1 was applied onto the titania microparticle layer (a) through spin coating, and thermal treatment was performed in a manner similar to that employed in Example 1, to thereby form a carbon film precursor on the titania microparticle layer (a). The thus-formed carbon film precursor was thermally treated in a manner similar to that employed in Example 1, to thereby produce a carbon film laminate.

Example 4

An alumina intermediate layer (B) was produced in a manner similar to that employed in Example 3. Separately, ion-exchange water was added to a 40 wt. % titania slurry (STS- 21 (mean particle size: 20 nm), product of Ishihara Sangyo Kaisha, Ltd.), to thereby form a 20 wt. % titania slurry. The titania slurry was applied onto the alumina intermediate layer (B) through spin coating, and a titania microparticle layer (b) (surface layer) was produced in a manner similar to that employed in Example 3. A polyamic acid solution (I) in an amount three times that employed in Example 1 was applied onto the titania microparticle layer (b) through spin coating, and thermal treatment was performed in a manner similar to that employed in Example 1, to thereby form a carbon film precursor on the titania microparticle layer (b). The thus-formed carbon film precursor was thermally treated in a manner similar to that employed in Example 1, to thereby produce a carbon film laminate.

Example 5

In a manner similar to that employed in Example 3, a titania microparticle layer (a) (surface layer) was provided on an alumina intermediate layer (B). Specifically, a polyamic acid solution (I) in an amount six times that employed in Example 1 was applied onto the titania microparticle layer (a) through spin coating, and thermal treatment was performed in a manner similar to that employed in Example 1, to thereby form a carbon film precursor on the titania microparticle layer (a). The thus-formed carbon film precursor was thermally treated in a manner similar to that employed in Example 1, to thereby produce a carbon film laminate.

Example 6

In a manner similar to that employed in Example 3, a titania microparticle layer (a) (surface layer) was provided on an alumina intermediate layer (B). Specifically, a polyamic acid solution (I) in an amount ten times that employed in Example 1 was applied onto the titania microparticle layer (a) through spin coating, and thermal treatment was performed in a manner similar to that employed in Example 1, to thereby form a carbon film precursor on the titania microparticle layer (a). The thus-formed carbon film precursor was thermally treated in a manner similar to that employed in Example 1, to thereby produce a carbon film laminate.

Example 7

An alumina intermediate layer (B) was produced in a manner similar to that employed in Example 3. Separately, ion-exchange water was added to a 17 to 19 wt. % silica slurry (SS-120 (mean particle size: 110 nm), product of Shokubai Kagaku Kogyo), to thereby form a 9 wt. % silica slurry. The silica slurry was applied onto the alumina intermediate layer (B) through spin coating, and the porous body was dried under atmospheric conditions at 150° C. for one hour and then fired in a box furnace under atmospheric conditions at 500° C. for six hours, whereby a silica microparticle layer (surface layer) was produced. A polyamic acid solution (I) in an amount five times that employed in Example 1 was applied onto the silica microparticle layer through spin coating, and thermal treatment was performed in a manner similar to that employed in Example 1, to thereby form a carbon film precursor on the silica microparticle layer. The thus-formed carbon film precursor was thermally treated in a manner similar to that employed in Example 1, to thereby produce a carbon film laminate.

Example 8

An alumina intermediate layer (B) was produced in a manner similar to that employed in Example 3. Separately, a zirconia powder (TZ8Y, product of Tosoh Corporation), ion-exchange water, and a dispersant (Aron A-6114, product of Toagosei Co., Ltd.) (3 wt. %) were mixed by means of a pot mill, to thereby form a 40 wt. % zirconia slurry. Subsequently, zirconia stones (diameter: 2 mmφ and 0.3 mmφ) were added to the slurry, and the slurry was pulverized/deflocculated to a particle size of 0.1 μm by means of a pot mill. The thus-obtained slurry was mixed with PVA (PA-24, product of Shin-Etsu Chemical Co., Ltd.) aqueous solution, to thereby obtain a slurry having a solid content of 5 wt. %. The slurry was formed into film on the alumina intermediate layer (B) through filtration. The porous substrate was dried under atmospheric conditions at 90° C. for 30 minutes, and then fired in a box furnace under atmospheric conditions at 1,000° C. for two hours, whereby a zirconia microparticle layer (surface layer) is formed. Polyamic acid (PAA-Larc-TPI, product of Mitsui Chemicals, Inc.), which serves as a precursor for polyimide represented by formula (9), was diluted with N,N-dimethylacetamide, to thereby produce a polyamic acid solution (II) having a polyamic acid content of 15 wt. %. The polyamic acid solution was applied onto the zirconia microparticle layer through spin coating, and thermally treated in a manner similar to that employed in Example 1, to thereby provide a carbon film precursor on the zirconia miroparticle layer. The thus-formed carbon film precursor was thermally treated in a manner similar to that employed in Example 1, to thereby produce a carbon film laminate.

Example 9

An alumina intermediate layer (B) was produced in a manner similar to that employed in Example 3. Separately, ion-exchange water was added to a 17 to 19 wt. % silica slurry (SS-120 (mean particle size: 110 nm), product of Shokubai Kagaku Kogyo), to thereby form a 1.8 wt. % silica slurry. The silica slurry was applied onto the alumina intermediate layer (B) through spin coating, and the porous body was dried under atmospheric conditions at 150° C. for one hour, whereby a silica layer is produced. Subsequently, ion-exchange water was added to a 40 wt. % titania slurry (STS-21 (mean particle size: 20 nm), product of Ishihara Sangyo Kaisha, Ltd.), to thereby form a 4 wt. % titania slurry. The titania slurry was applied onto the silica layer through spin coating, and the porous body was dried under atmospheric conditions at 150° C. for one hour and then fired in a box furnace under atmospheric conditions at 500° C. for six hours, whereby a titania microparticle layer (a) (surface layer) was produced. A polyamic acid solution (I) in the same amount as employed in Example 1 was applied onto the titania microparticle layer (a) through spin coating, and thermal treatment was performed in a manner similar to that employed in Example 1, to thereby form a carbon film precursor on the titania microparticle layer (a). The thus-formed carbon film precursor was thermally treated in a manner similar to that employed in Example 1, to thereby produce a carbon film laminate.

Comparative Example 1

Polyamic acid (PAA-Larc-TPI, product of Mitsui Chemicals, Inc.), which serves as a precursor for polyimide represented by formula (9), was diluted with N,N-dimethylacetamide, to thereby produce a polyamic acid solution (I) having a polyamic acid content of 10 wt. %. The polyamic acid solution was applied, through spin coating, onto a porous alumina disk substrate (product of NGK INSULATORS, LTD., mean particle size: 0.2 μm, mean pore size: 0.1 μm, φ: 14 mm, t=1.5 mm). The coated substrate was thermally treated under atmospheric conditions at 90° C. for 30 minutes and 300° C. for one hour, to thereby provide a carbon film precursor. The thus-produced carbon film precursor was thermally treated in a box furnace (nitrogen atmosphere) at 520° C. for 6 hours, to thereby produce a carbon film laminate. In the thermal treatment, temperature elevation rate was regulated to 300° C./hour from room temperature to 300° C., and to 60° C./hour from 300° C. to 520° C., and temperature lowering rate was regulated to 100° C./hour from 520° C. to room temperature.

Comparative Example 2

Polyamic acid (PAA-Larc-TPI, product of Mitsui Chemicals, Inc.), which serves as a precursor for polyimide represented by formula (9), was diluted with N,N-dimethylacetamide, to thereby produce a polyamic acid solution (II) having a polyamic acid content of 15 wt. %. In a manner similar to that employed in Comparative Example 1, the polyamic acid solution was applied onto an alumina porous substrate, dried, and thermally treated, to thereby form a carbon film precursor. The thus-formed carbon film precursor was thermally treated in a manner similar to that employed in Comparative Example 1, to thereby produce a carbon film laminate.

Comparative Example 3

In a manner similar to that employed in Comparative Example 1, the polyamic acid solution (II) in an amount 1.5 times that employed in Comparative Example 2 was applied onto an alumina porous substrate, dried, and thermally treated, to thereby form a carbon film precursor. The thus-formed carbon film precursor was thermally treated in a manner similar to that employed in Comparative Example 1, to thereby produce a carbon film laminate.

Comparative Example 4

In a manner similar to that employed in Comparative Example 1, the polyamic acid solution (II) in an amount four times that employed in Comparative Example 2 was applied onto an alumina porous substrate, dried, and thermally treated, to thereby form a carbon film precursor. The thus-formed carbon film precursor was thermally treated in a manner similar to that employed in Comparative Example 1, to thereby produce a carbon film laminate.

(Gas Separation Performance Evaluation)

Figure 4:
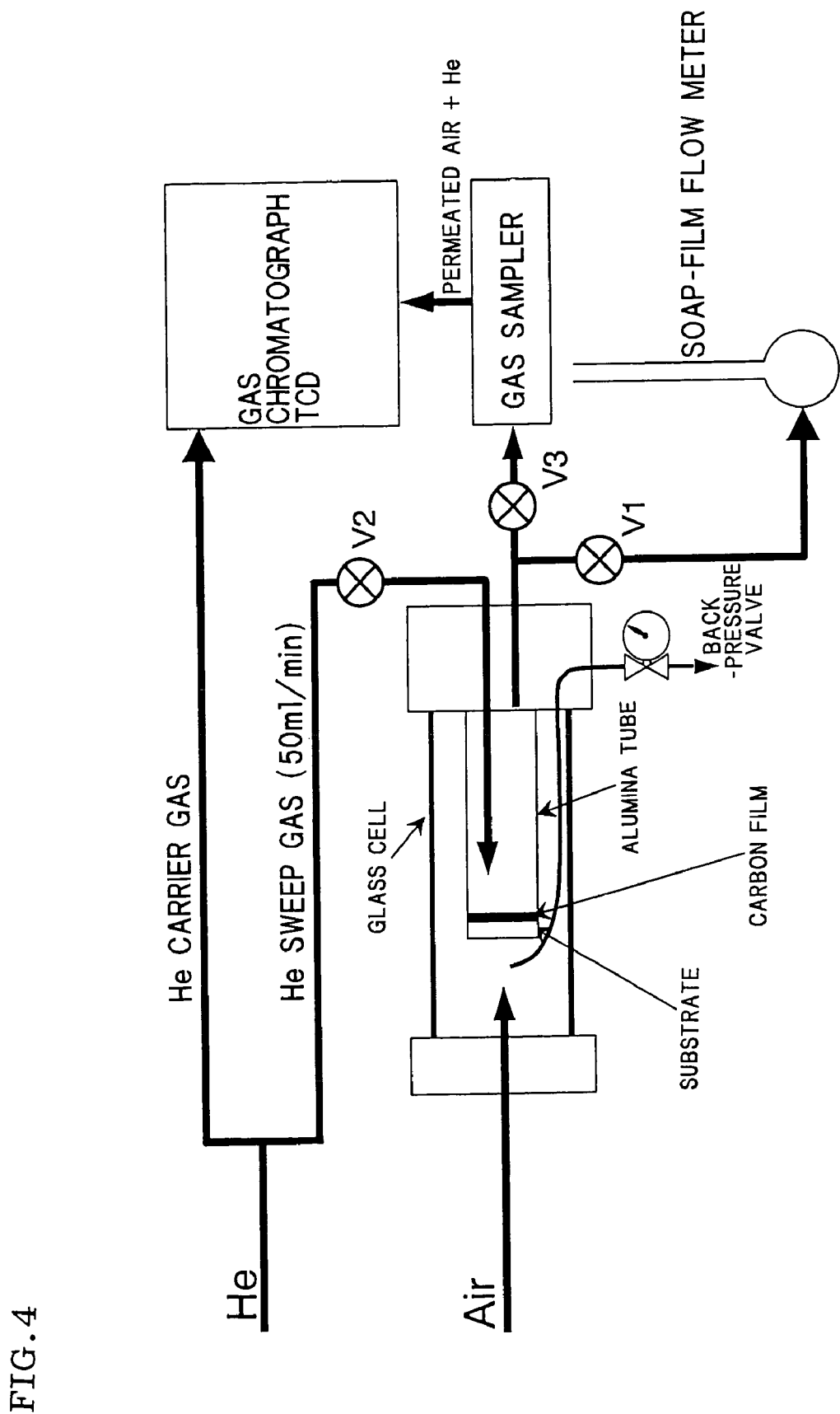
FIG. 4 is a schematic flow diagram showing a test machine for evaluating gas separation performance of the carbon film laminate (first mode) of the present invention employed in an Example.

The carbon film laminates produced in Examples 1 to 9 and Comparative Examples 1 to 4 were evaluated in terms of $O_2/N_2$ (oxygen/nitrogen) separation performance at room temperature by means of an evaluation apparatus shown in FIG. 4. An evaluation sample (carbon film laminate; i.e., carbon film/porous substrate) was bonded, on its carbon film side, to an end of a dense alumina tube by the mediation of polyimide resin, and the assembly was placed in a tubular glass cell. Dry air ($O_2/N_2=21/79$ (by mole)) was fed into the cell.

Separation performance of each carbon film laminate was evaluated on the basis of separation factor. Separation factor is defined as the ratio of compositional ratio of permeated gas to compositional ratio of fed gas. For example, $O_2/N_2$ separation factor α is represented by equation (i)

$$\alpha = \{Perm(O_2)/Perm(N_2)\}/\{Feed(O_2)/Feed(N_2)\} \quad (i)$$

(wherein $Perm(O_2)$ and $Perm(N_2)$ represent permeated $O_2$ and $N_2$ mole concentrations, and $Feed(O_2)$ and $Feed(N_2)$ represent fed $O_2$ and $N_2$ mole concentrations ($Feed(O_2)/Feed(N_2)=0.266$ as dry air). Among the valves shown in FIG. 4, valve V1 was closed, and valves V2 and V3 were opened. Dry air was supplied to the substrate of each evaluation sample, while He sweep gas was fed to the carbon film (50 mL/min). In this case, a difference in gas concentration was achieved between the feed side and the permeated side with respect to the carbon film, whereby $O_2$ and $N_2$ permeated the carbon film. The permeated gas was transferred to a TCD gas chromatograph, where component concentrations of the permeated gas were determined. The same test was also performed when the fed dry air was pressurized to 0.5 to 2.0 kgf/cm² (gauge pressure) through closing a back-pressure valve.

Gas permeation performance of each carbon film laminate was evaluated on the basis of permeation rate R, represented by equation (ii). Among the valves shown in FIG. 4, valves V2 and V3 were closed, and valve V1 was opened. Through controlling the back-pressure valve, fed dry air was pressurized to 0.5 to 2.0 kgf/cm² (gauge pressure). In this case, a difference in gas concentration was achieved between the feed side and the permeated side with respect to the carbon film, whereby $O_2$ and $N_2$ permeated the carbon film. The permeated gas was transferred to a soap-film flow meter, where the time for reaching a predetermined volume was determined. The flow rate of the permeated gas was obtained from the value. The permeated gas flow rate was reduced in accordance with the $O_2/N_2$ separation factor determined, to thereby obtain flow rate of permeated oxygen [mol/s]. The flow rate [mol/s] of permeated oxygen was divided by film area [m²] and difference in oxygen partial pressure [Pa] between the feed side and the permeated side, to thereby calculate oxygen permeation rate [mol·m⁻²·Pa⁻¹·s⁻¹].

$$R = Q/\{(P1-P2) \cdot A \cdot t\} \quad (ii)$$

Q: Amount of permeated gas [mol]
P1: Partial pressure of fed gas [Pa]
P2: Partial pressure of permeated gas [Pa]
A: Film area [m²]
t: Time [s]

Figure 5:
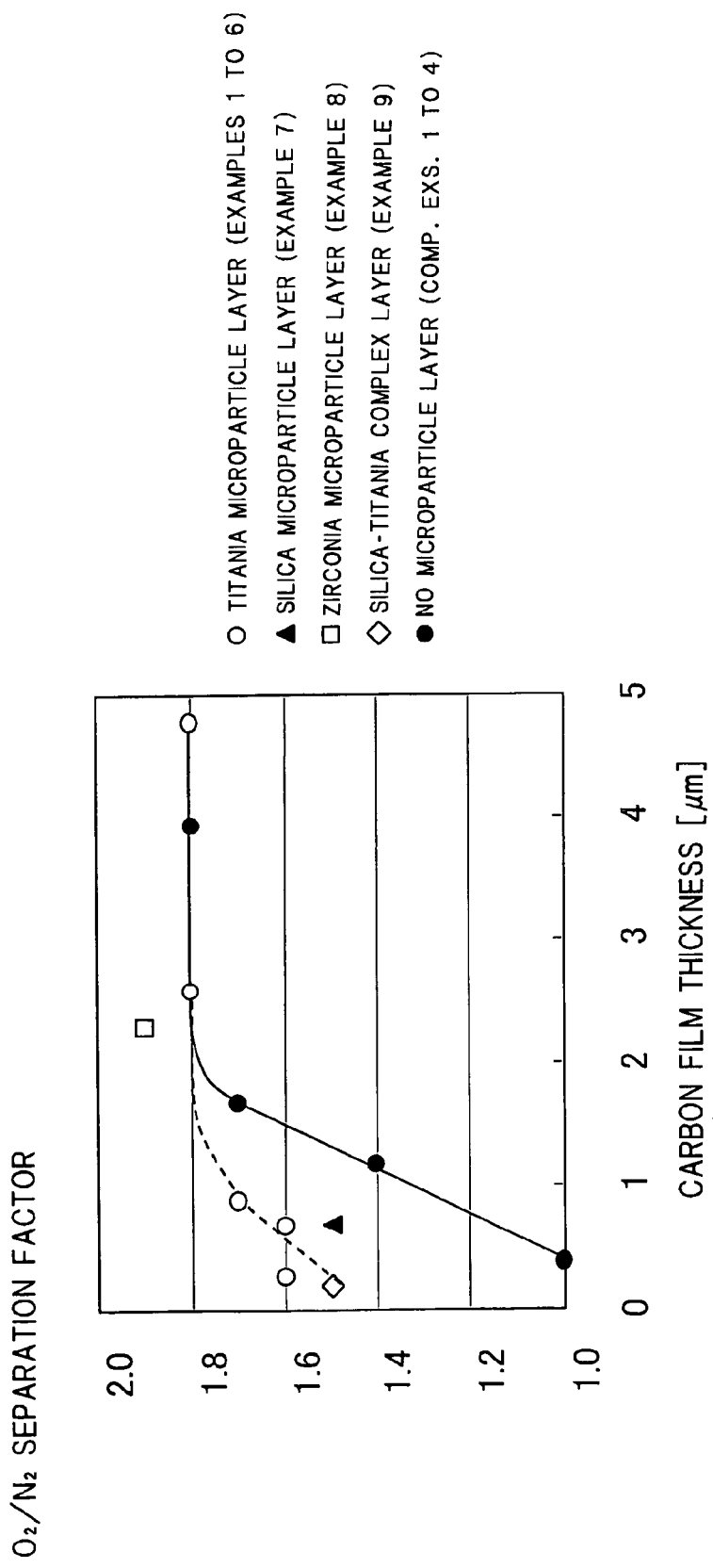
FIG. 5 is a graph showing the relationship between carbon film thickness and oxygen/nitrogen separation factor of the carbon film laminate (first mode) of the present invention obtained in an Example.
Figure 6:
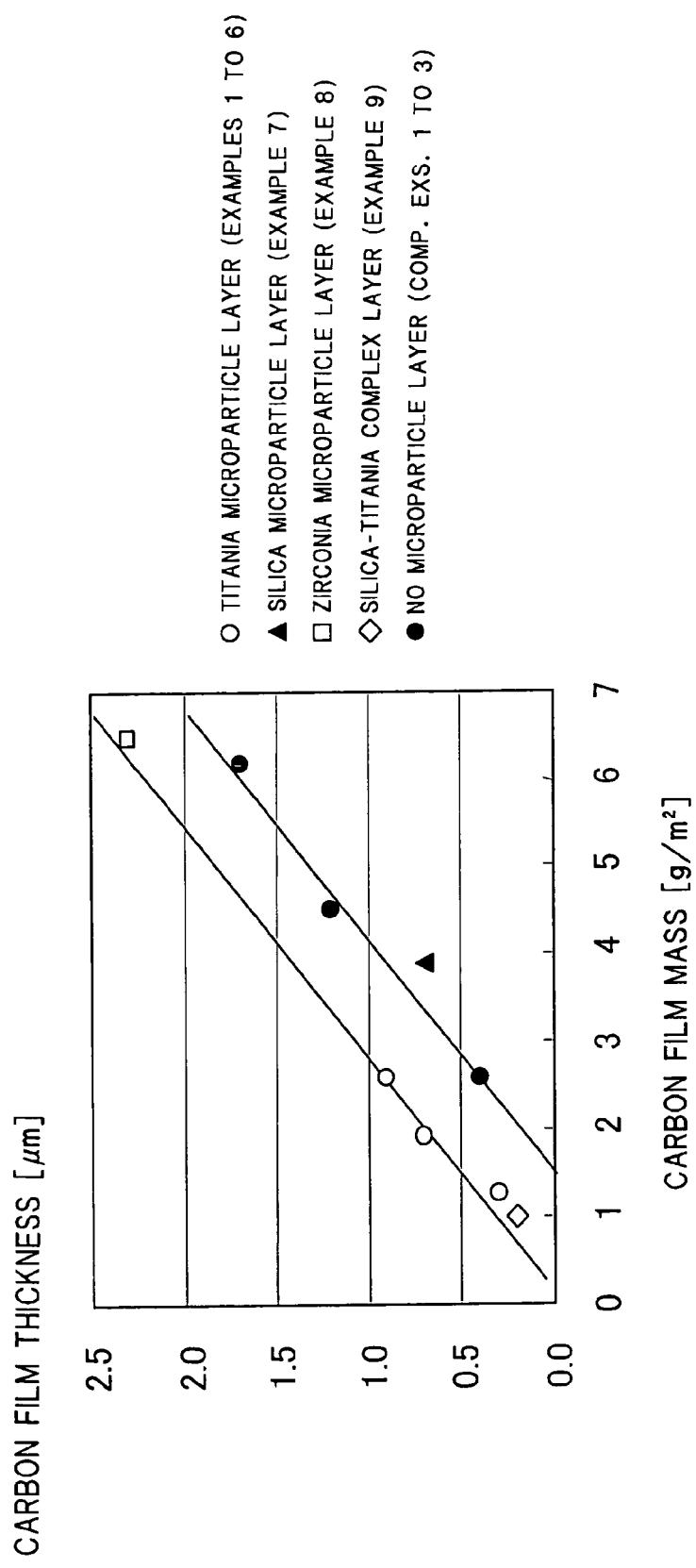
FIG. 6 is a graph showing the relationship between carbon film mass and carbon film thickness of the carbon film laminate (first mode) of the present invention obtained in an Example.

Tables 1 and 2 and FIGS. 5 and 6 show the results. FIG. 5 is a graph showing the relationship between carbon film thickness and oxygen/nitrogen separation factor, and FIG. 6 is a graph showing the relationship between mass of carbon film and carbon film thickness.

TABLE 1

| | Alumina intermediate layer | | Microparticle layer | | | Carbon film thickness [μm] | $O_2/N_2$ separation factor | $O_2$ Permeation rate [mol·m⁻²·Pa⁻¹·s⁻¹] |
|---|---|---|---|---|---|---|---|---|
| | Mean particle size [μm] | Thickness [μm] | Material | Mean particle size [nm] | Thickness [μm] | | | |
| Ex. 1 | 0.7 | 4 | Titania | 20 | 0.5 | 0.3 | 1.6 | 4.0 × 10⁻⁷ |
| Ex. 2 | 0.7 | 8 | Titania | 20 | 0.5 | 0.9 | 1.7 | 3.6 × 10⁻⁷ |
| Ex. 3 | 0.2 | 7 | Titania | 20 | 0.5 | 0.7 | 1.6 | 2.5 × 10⁻⁷ |

TABLE 1-continued

| | Alumina intermediate layer | | Microparticle layer | | | Carbon film thickness [μm] | $O_2/N_2$ separation factor | $O_2$ Permeation rate [mol · m$^{-2}$ · Pa$^{-1}$ · s$^{-1}$] |
|---|---|---|---|---|---|---|---|---|
| | Mean particle size [μm] | Thickness [μm] | Material | Mean particle size [nm] | Thickness [μm] | | | |
| Ex. 4 | 0.2 | 7 | Titania | 20 | 2.5 | 0.9 | 1.7 | $2.4 \times 10^{-7}$ |
| Ex. 5 | 0.2 | 7 | Titania | 20 | 0.5 | 2.6 | 1.8 | $1.2 \times 10^{-7}$ |
| Ex. 6 | 0.2 | 7 | Titania | 20 | 0.5 | 4.8 | 1.8 | $6.1 \times 10^{-8}$ |
| Ex. 7 | 0.2 | 6 | Silica | 110 | 2.0 | 0.7 | 1.5 | $2.1 \times 10^{-7}$ |
| Ex. 8 | 0.2 | 6 | Zirconia | 100 | 2.5 | 2.3 | 1.9 | $1.4 \times 10^{-7}$ |
| Ex. 9 | 0.2 | 10 | Silica-Titania composite layer | Silica (110) Titania (20) | Silica (0.5) Titania (0.5) | 0.2 | 1.5 | $4.0 \times 10^{-7}$ |

TABLE 2

| | Alumina intermediate layer | | Carbon film thickness [μm] | $O_2/N_2$ separation factor | $O_2$ Permeation rate [mol · m$^{-2}$ · Pa$^{-1}$ · s$^{-1}$] |
|---|---|---|---|---|---|
| | Mean particle size [μm] | Thickness [μm] | | | |
| Comp. Ex. 1 | 0.2 | 10 | 0.4 | 1.0 | $5.4 \times 10^{-7}$ |
| Comp. Ex. 2 | 0.2 | 10 | 1.2 | 1.4 | $2.1 \times 10^{-7}$ |
| Comp. Ex. 3 | 0.2 | 10 | 1.7 | 1.7 | $1.2 \times 10^{-7}$ |
| Comp. Ex. 4 | 0.2 | 10 | 4.0 | 1.8 | $5.0 \times 10^{-8}$ |

(Results 1)

As shown in Tables 1 and 2 and FIG. 5, evaluation samples of the Comparative Examples having no microparticle layer (surface layer) exhibited drastic drop in separation factor when the carbon film thickness was reduced to 2 μm or less, and exhibited no separation factor when the film thickness was 0.3 μm. In contrast, an evaluation sample having a microparticle layer (surface layer) maintained the separation factor at 1.5 or higher, when the film thickness increased to 0.2 μm (Example 9). Through employment of a carbon film laminate exhibiting an $O_2/N_2$ separation factor of 1.5, a feed-side oxygen concentration of 21% can be enriched to 28%. As film thickness decreases, permeation rate increases. For example, when the film thickness was 0.3 μm, $O_2/N_2$ separation factor was 1.6, and oxygen permeation rate was $4.0 \times 10^{-7}$ [mol·m$^{-2}$·Pa$^{-1}$·s$^{-1}$] (Example 1).

(Results 2)

As shown in FIG. 6, carbon film thickness is in proportion to mass of carbon film. The samples having a surface layer made of titania microparticles or zirconia microparticles plot on a straight line passing the origin (having no y-intercept segment) in FIG. 6. In contrast, the samples having no microparticle layer or having a silica surface layer plot on a straight line not passing the origin (having a negative y-intercept segment). These profiles indicate that the former samples have no composite layer formed of carbon and a porous substrate, and that polyamic acid migrates to the interparticle spaces of the substrate of the latter samples during application, forming a composite layer. The composite layer is conceived not to be related to gas separation but to reduce amount of permeated gas. Therefore, the former samples are advantageous from the viewpoint of increasing the amount of permeation. The sample having a titania microparticle layer (Example 3) and that having a silica microparticle layer (Example 7) have the same carbon film thickness. However, the sample employing titania microparticles exhibited a greater oxygen permeation rate even though the separation factor is slightly large. This indicates that titania microparticles suppresses formation of a composite layer, thereby increasing permeation rate.

Example 10

A polyimide resin layer-provided porous substrate produced in a manner similar to that employed in Example 1 was thermally treated in a box furnace (nitrogen atmosphere) at 700° C. for six hours, to thereby carbonize a carbon film precursor, whereby a carbon film laminate was produced. The thus-produced carbon film was found to have a thickness of 0.1 μm. In evaluation of $O_2/N_2$ separation performance of the carbon film laminate, $O_2/N_2$ separation factor was found to be 1. A volatile organic compound (VOC) permeation test was carried out. In the test, $N_2$ gas containing 1 vol. % of xylene—a typical VOC—was caused to permeate. The gas was analyzed through gas chromatograph before and after permeation, and the xylene concentration of the permeated gas was found to be reduced to 1/10 that of the fed gas (before permeation).

An embodiment of the second mode of the carbon film laminate of the present invention and an embodiment of the second mode of the method for producing the same will be described.

(Method of Producing Carbon Film Laminate)

Polyamic acid (PAA-Larc-TPI, product of Mitsui Chemicals, Inc.), which serves as a precursor for polyimide represented by formula (10), was diluted with N,N-dimethylacetamide, to thereby produce a polyamic acid solution (III) having a polyamic acid content of 15 wt. %. The polyamic acid solution was applied, through spin coating, onto a porous alumina disk substrate (product of NGK INSULATORS, LTD., mean pore size: 0.1 μm, φ: 14 mm, t=1.5 mm). The coated substrate was thermally treated under atmospheric conditions at 90° C. for 30 minutes and 300° C. for one hour, to thereby produce a polyimide resin layer-provided substrate including a porous substrate and a polyimide resin layer formed on the porous substrate. The thus-produced polyimide resin layer-provided substrate was thermally treated in a box furnace (nitrogen atmosphere) at a predetermined carbonization temperature for a predetermined time, to thereby produce a carbon film (2 to 5 μm) on the porous alumina substrate. In the thermal treatment, temperature elevation rate was regulated to 300° C./hour from room temperature to 300° C., and to 60° C./hour from 300° C. to carbonization temperature, and temperature lowering rate was regulated to 100° C./hour from carbonization temperature to room temperature.

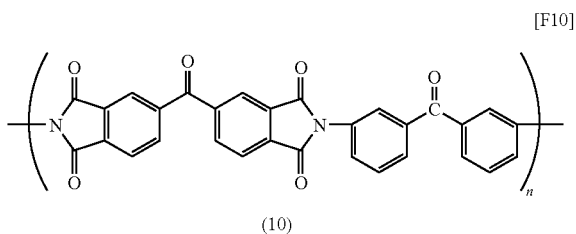

[F10]

(10)

(Method of Producing Self-standing Carbon Film (Carbon Film Alone))

Polyamic acid (PAA-Larc-TPI, product of Mitsui Chemicals, Inc.), which serves as a precursor for polyimide represented by formula (10), was diluted with N,N-dimethylacetamide, to thereby produce a polyamic acid solution (IV) having a polyamic acid content of 24 wt. %. The polyamic acid solution was applied onto a glass slide, and thermally treated under atmospheric conditions at 90° C. for 30 minutes and at 300° C. for one hour, to thereby produce a polyimide resin layer-provided glass slide including a glass slide and the polyimide resin layer formed on the glass slide. The thus-obtained polyimide resin layer-provided glass slide was immersed in ion-exchange water for 1 to 2 days, and polyimide resin was peeled off from the glass slide. The thus-obtained polyimide resin (alone) film (self-standing resin film) was found to have a thickness of 20 to 50 μm. The self-standing resin film was cut into disk samples (diameter: 14 to 18 mm), and the samples were thermally treated in a box furnace (nitrogen atmosphere) at a predetermined carbonization temperature for a predetermined time, to thereby produce a self-standing carbon film. In the thermal treatment, temperature elevation rate was regulated to 300° C./hour from room temperature to 300° C., and to 60° C./hour from 300° C. to carbonization temperature, and temperature lowering rate was regulated to 100° C./hour from carbonization temperature to room temperature.

(Method of Determining Percent Shrinkage)

Polyamic acid (PAA-Larc-TPI, product of Mitsui Chemicals, Inc.), which serves as a precursor for polyimide represented by formula (10), was diluted with N,N-dimethylacetamide, to thereby produce a polyamic acid solution (IV) having a polyamic acid content of 24 wt. %. The polyamic acid solution was applied onto a glass slide, and thermally treated under atmospheric conditions at 90° C. for 30 minutes and at 300° C. for one hour, to thereby produce a polyimide resin layer-provided glass slide including a glass slide and the polyimide resin layer formed on the glass slide. The thus-obtained polyimide resin layer-provided glass slide was immersed in ion-exchange water for 1 to 2 days, and polyimide resin was peeled off from the glass slide. The thus-obtained polyimide resin (alone) film (self-standing resin film) was found to have a thickness of 20 to 50 μm. The self-standing resin film was cut into rectangular samples of predetermined dimensions. Each sample was rolled to thereby provide a test sample. The sample was thermally treated in a box furnace (nitrogen atmosphere) at a predetermined carbonization temperature for a predetermined time. During the treatment, a thermal expansion/shrinkage curve was obtained through the tension method by means of TMA 4000S (product of Bruker AXS), whereby percent shrinkage was obtained. In the thermal treatment, temperature elevation rate was regulated to 300° C./hour from room temperature to 300° C., and to 60° C./hour from 300° C. to carbonization temperature, and temperature lowering rate was regulated to 100° C./hour from carbonization temperature to room temperature.

(Structure Analysis)

An IR absorption spectrum of each of the produced carbon films was measured by means of an FT-IR Spectrometer (SPECTRUM 2000, product of PERKIN ELMER) combined with a golden-gate type ATR apparatus (product of System Engineering), whereby molecular structure was analyzed.

Examples 11 to 19

According to aforementioned method (method for producing a carbon film laminate), precursors were thermally treated at a temperature and for a time shown in Tables 3 and 4, to thereby obtain carbon film laminates. According to the aforementioned method (method for determining percent shrinkage), self-standing resin film (polyimide resin alone film) was carbonized under the same thermal treatment conditions (temperature and time) as employed for producing carbon film laminates, whereby thermal expansion/shrinkage curves thereof were obtained. Percent shrinkage of carbon film samples attached to the substrate was determined by use of the curves.

Comparative Example 5 to 9

According to aforementioned method (method for producing a self-standing carbon film), precursors were thermally treated at a temperature and for a time shown in Table 5, to thereby obtain self-standing carbon films. According to the aforementioned method (method for determining percent shrinkage), self-standing resin film (polyimide resin alone film) was carbonized under the same thermal treatment conditions (temperature and time) as employed for producing self-standing carbon films, whereby thermal expansion/ shrinkage curves thereof were obtained. Percent shrinkage of self-carbon film samples was determined by use of the curves.

TABLE 3

| Ex. | Carbonization temperature [° C.] | Carbonization time [hour] | Percent shrinkage [%] | $O_2/N_2$ separation factor | Oxygen permeation factor [mol·m·s$^{-1}$·Pa$^{-1}$·m$^{-2}$] |
|---|---|---|---|---|---|
| 11 | 500 | 1 | 4 | 5 | $4.0 \times 10^{-15}$ |
| 12 | 470 | 6 | 3 | 5 | $1.0 \times 10^{-15}$ |
| 13 | 500 | 2 | 5.5 | 4 | $1.0 \times 10^{-14}$ |
| 14 | 480 | 6 | 6.5 | 4 | $6.0 \times 10^{-15}$ |
| 15 | 500 | 6 | 9 | 3 | $6.0 \times 10^{-14}$ |
| 16 | 520 | 1 | 7 | 3 | $9.0 \times 10^{-14}$ |
| 17 | 520 | 6 | 13.5 | 2 | $3.0 \times 10^{-13}$ |
| 18 | 600 | 6 | 15 | 1 | $9.0 \times 10^{-13}$ |
| 19 | 700 | 6 | 30 | 1 | $1.2 \times 10^{-12}$ |

TABLE 4

| Ex. | Carbonization temperature [° C.] | Carbonization time [hour] | Percent shrinkage [%] | $CO_2/CH_4$ separation factor | $CO_2$ permeation factor [mol·m·s$^{-1}$·Pa$^{-1}$·m$^{-2}$] |
|---|---|---|---|---|---|
| 14 | 480 | 6 | 6.5 | 50 | $2.0 \times 10^{-14}$ |
| 15 | 500 | 6 | 9 | 15 | $3.3 \times 10^{-13}$ |
| 17 | 520 | 6 | 13.5 | 5 | $7.0 \times 10^{-13}$ |

TABLE 5

| Comp. Ex. | Carbonization temperature [° C.] | Carbonization time [hour] | Percent shrinkage [%] | $O_2/N_2$ separation factor | Oxygen permeation factor [mol·m·s$^{-1}$·Pa$^{-1}$·m$^{-2}$] |
|---|---|---|---|---|---|
| 5 | 520 | 0.25 | 3 | 5 | $5.0 \times 10^{-14}$ |
| 6 | 520 | 3 | 9.5 | 5 | $1.2 \times 10^{-13}$ |
| 7 | 520 | 6 | 13.5 | 4 | $2.0 \times 10^{-13}$ |
| 8 | 500 | 6 | 9 | 4 | $1.2 \times 10^{-13}$ |
| 9 | 480 | 6 | 6.5 | 4.5 | $3.0 \times 10^{-14}$ |

(Test Method for $O_2/N_2$ Separation Performance and $CO_2/CH_4$ Separation Performance)

Figure 7:
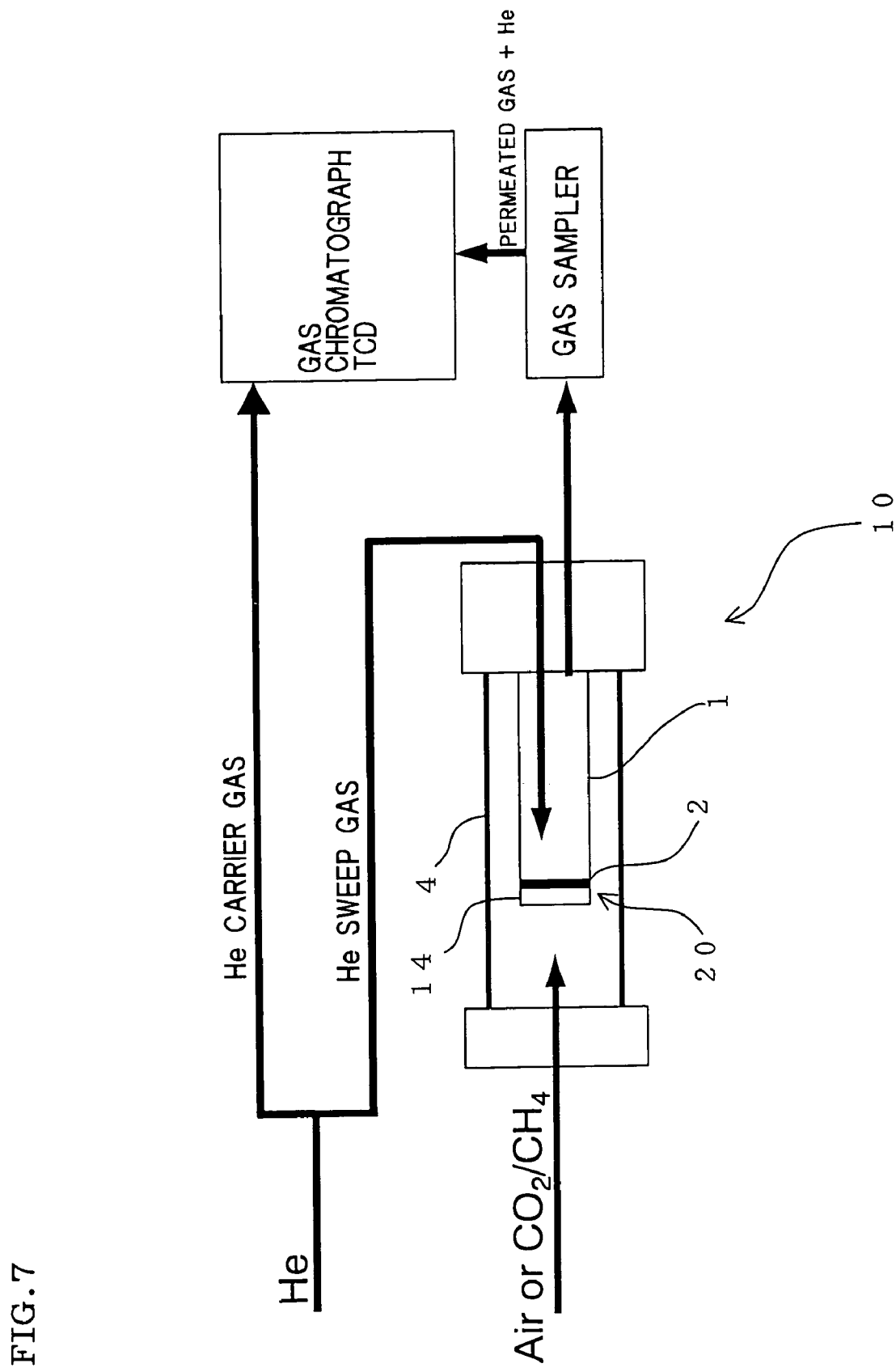
FIG. 7 is a schematic diagram showing a test machine for performance evaluation of the carbon film laminate (second mode) of the present invention.

The carbon film laminates produced in Examples 11 to 19 and the self-standing carbon films produced in Comparative Examples 5 to 9 were evaluated in terms of $O_2/N_2$ separation performance and $CO_2/CH_4$ separation performance at room temperature by means of an evaluation apparatus 20 shown in FIG. 7. An evaluation sample 30 (carbon film laminate or self-standing carbon film) was bonded, on its carbon film 12 side, to an end of a dense alumina tube 11 by the mediation of polyimide resin, and the assembly was placed in a tubular glass cell 14. In FIG. 7, a carbon film laminate including a porous substrate 24 and a carbon film 12 was fixed as an evaluation sample 30. In $O_2/N_2$ separation performance test, dry air ($O_2/N_2$=21/79 (by mole)) was fed, whereas in $CO_2/CH_4$ separation performance test, a $CO_2/CH_4$ gas mixture ($CO_2/CH_4$=50/50 (by mole)) was fed. The gas was fed into the tubular glass cell 14, while He sweep gas was circulated in the alumina tube 11. In this case, a difference in gas concentration was achieved between the feed side and the permeated side with respect to the carbon film 12, whereby the gas permeated the carbon film 12. The permeated gas was transferred to a TCD gas chromatograph, where component concentrations (by mole) of the permeated gas were determined.

Gas separation performance of each carbon film laminate was evaluated on the basis of $O_2/N_2$ separation factor ($\alpha(O_2/N_2)$) represented by equation (iii), $CO_2/CH_4$ separation factor ($\alpha(CO_2/CH_4)$) represented by equation (iv), and permeation factor P [mol·m·s$^{-1}$·Pa$^{-1}$·m$^{-2}$] represented by equation (v). Each separation factor is defined as the ratio of compositional ratio of permeated gas to compositional ratio of fed gas. $O_2/N_2$ separation factor $\alpha(O_2/N_2)$ is represented by equation (iii):

$$\alpha(O_2/N_2) = \{Perm(O_2)/Perm(N_2)\}/\{Feed(O_2)/Feed(N_2)\} \quad \text{(iii)},$$

and $CO_2/CH_4$ separation factor $\alpha(CO_2/CH_4)$ is represented by equation (iv):

$$\alpha(CO_2/CH_4) = \{Perm(CO_2)/Perm(CH_4)\}/\{Feed(CO_2)/Feed(CH_4)\} \quad \text{(iv)}$$

(wherein Perm($O_2$), Perm($N_2$), Perm($CO_2$), and Perm($CH_4$) represent permeated $O_2$, $N_2$, $CO_2$, and $CH_4$ mole concentrations, and Feed($O_2$), Feed($N_2$), Feed($CO_2$), and Feed($CH_4$) represent fed $O_2$, $N_2$, $CO_2$, and $CH_4$ mole concentrations.

$$P = Q \cdot f / \{(P1-P2) \cdot A \cdot t\} \quad \text{(v)}$$

(wherein, Q represents amount of permeated gas [mol], f represents film thickness [m], P1 represents partial pressure of fed gas [Pa], P2 represents partial pressure of permeated gas [Pa], A represents film area [m$^2$], and t represents time [s])

(Test Method for Air/VOC Separation Performance)

Figure 8:
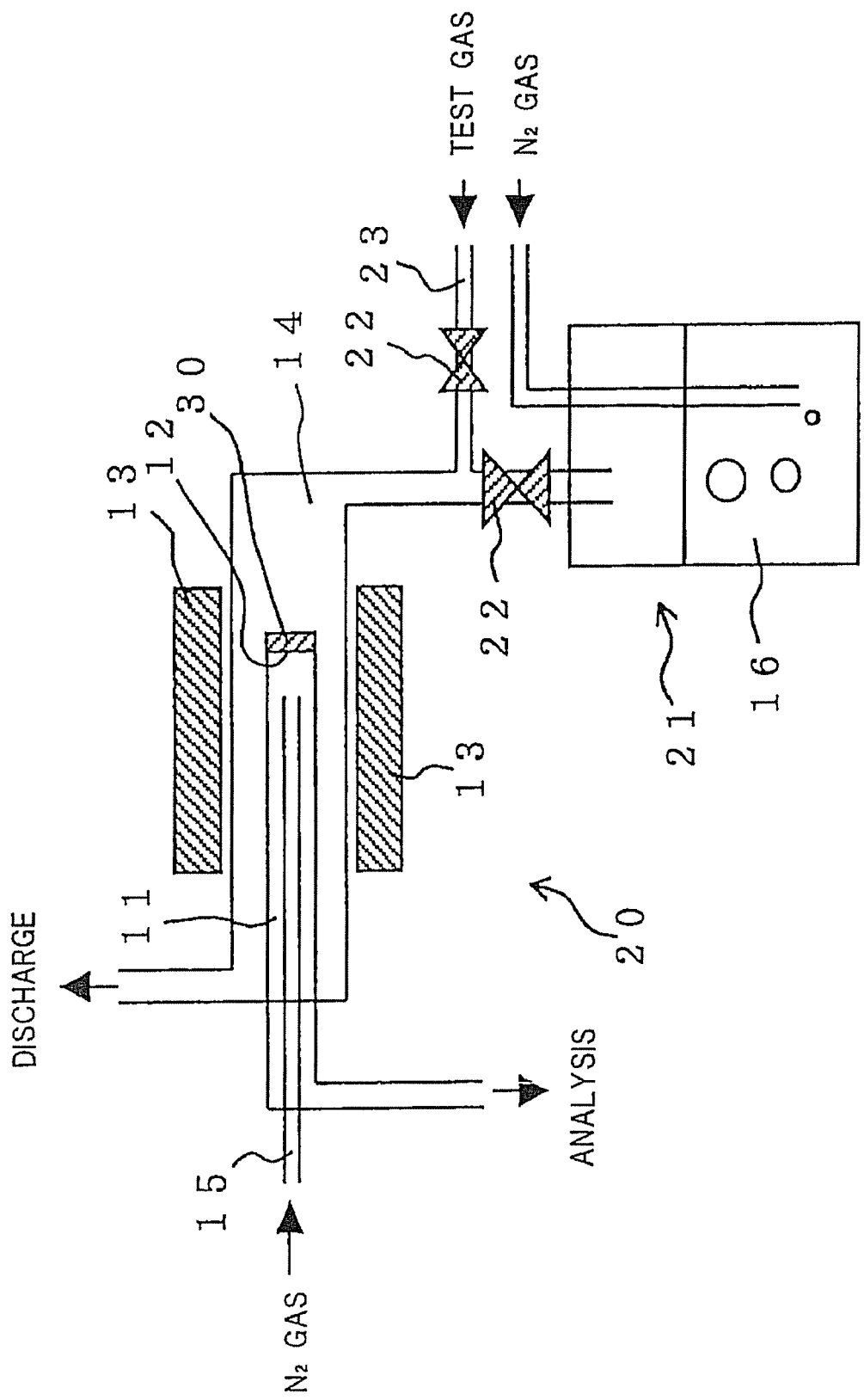
FIG. 8 is a schematic diagram showing another test machine for performance evaluation of the carbon film laminate (second mode) of the present invention.

The samples were evaluated in terms of xylene (typical VOC) permeation performance at room temperature. FIG. 8 is a schematic representation showing a gas permeation test apparatus 20 employed for the gas permeation test. An evaluation sample 30 (carbon film 12) was bonded, on its carbon film side, to an end of a dense alumina tube 11 by the mediation of polyimide resin, and the assembly was placed in a tubular glass cell 14. Xylene 16 contained in a bubbler 21 was bubbled with nitrogen (100 mL/min) at room temperature, to thereby produce a xylene (o-, m-, and p-xylene) equimol-gas mixture serving as a test gas. The test gas was introduced into a tubular glass cell 14 in which the alumina tube 11 was disposed. Nitrogen gas (sweep gas, 50 mL/min) was fed to a quartz tuber 15 disposed inside the alumina tube 11, in order to collect the gas which had permeated the carbon film 12. The gas containing the gas which had permeated the carbon film 12 was sampled and analyzed through gas chromatography. The results were evaluated on the basis of xylene permeation factor P $[mol \cdot m \cdot s^{-1} \cdot Pa^{-1} \cdot m^{-2}]$. In FIG. 8, reference numeral 13 denotes a tubular furnace, 22 denotes a valve, and 23 denotes a gas conduit.

(Results: Percent Shrinkage)

Figure 9:
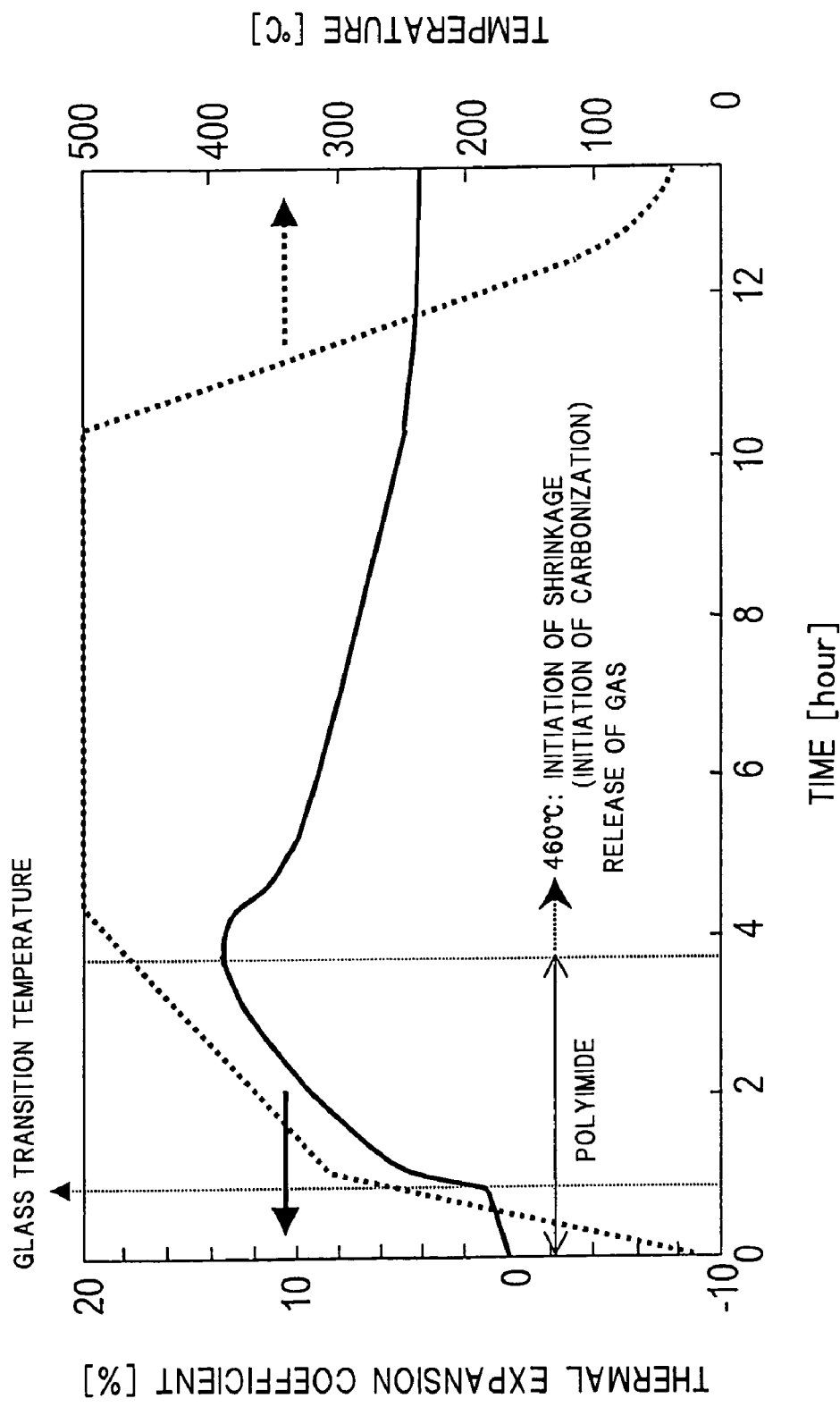
FIG. 9 is an exemplary thermal treatment temperature profile of a thermal expansion/shrinkage curve obtained in percent shrinkage measurement.

During measuring percent shrinkage, polyimide resin film (self-standing resin film) was carbonized to form a black film. FIG. 9 shows a thermal expansion/shrinkage curve of a polyimide resin film in the course of carbonization at 500° C. for 6 hours. As shown in FIG. 9, the polyimide resin film gradually expanded to the glass transition temperature (about 250° C.). Percent expansion increased at a temperature higher than the glass transition temperature. At 460° C., shrinking initiated and was continued to the time of completion of cooling. Particularly, shrinkage was most significant for the first two hours from the time of reaching the carbonization temperature. From the results, change of polyimide resin film to carbon film exhibiting gas separation performance is conceived to have the following four steps.

(1) Room temperature to 250° C.

Expansion is not significant in a thermal expansion temperature region equal to or lower than glass transition temperature.

(2) 250° C. to 460° C.

Expansion is significant in a thermal expansion region equal to or higher than glass transition temperature. In the region, polyimide is conceived to be in a supercooled liquid state.

(3) 460° C. to the end of maintenance of carbonization temperature

Figure 10:
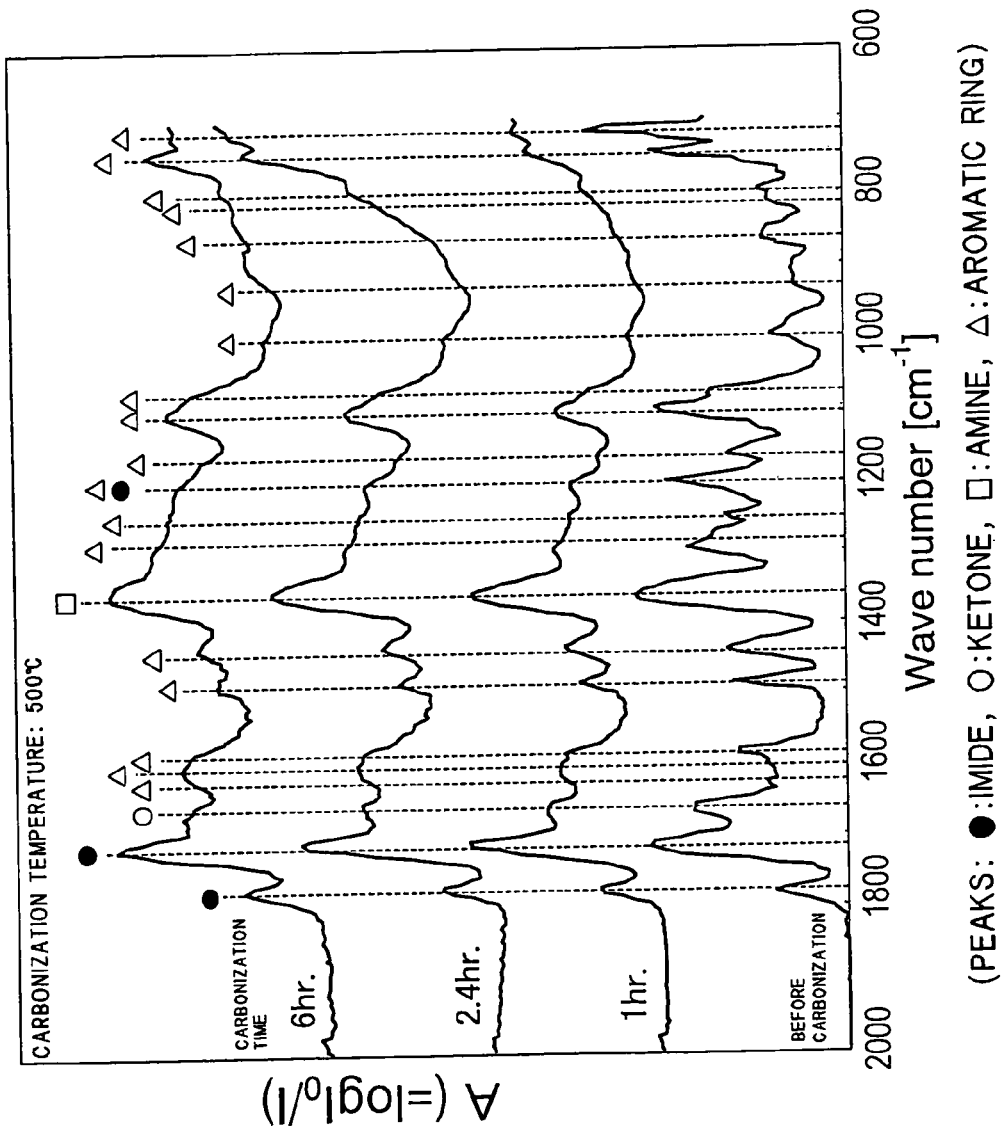
FIG. 10 provides an exemplary chart of infrared absorption spectra employed for structural analysis of carbon film.

Expansion turns to shrinkage at about 460° C. as a turning point. Thereafter, the film is continuously shrunk. Particularly, shrinkage was most significant for the first two hours from the time of reaching the carbonization temperature. FIG. 10 shows infrared spectra of the same film at various carbonization times. The initial spectrum gradually assumed a broaden peak profile as time elapsed. Particularly, peaks attributed to ketone and aromatic rings were significantly broaden, indicating that these structural fragments were preferentially disordered. The structural change as elapse of carbonization time was most significant for the first two hours from the time of reaching the carbonization temperature, and shrinkage thereafter was relatively small. The feature was coincided with the aforementioned shrinkage behavior. As a result, the shrinkage is conceived to be attributed to release of gas from functional groups (particularly ketone and aromatic rings) of polyimide; i.e., carbonization.

(4) Carbonization temperature to room temperature

When the temperature was lowered, the film was shrunk. However, shrinkage is small as compared with that observed during maintenance at carbonization temperature. This phenomenon is conceived to be attributed to that release of gas is stopped during cooling, and the observed percent shrinkage is almost provided from that of carbon film per se.

As a result, the following mechanism could be conceived. When a polyimide resin film formed on a porous substrate is carbonized, compressive stress is applied to the film in region (1); the stress is relaxed in region (2); and the film is restricted again by the substrate in region (3), whereby tensile stress applied to the film mainly determines the pore size. Therefore, shrinkage behavior after region (3) is significant. Thus, in the present invention, percent shrinkage [%] of self-standing resin film within a period of time at which maximum expansion is attained during temperature elevation to the time of the end of temperature lowering is defined as "percent shrinkage [%] after initiation of shrinkage."

(Relationship Between Separation Performance and Percent Shrinkage of Carbon Film Formed on Porous Substrate)

Table 3 shows the relationship between carbonization conditions under which a polyimide resin layer formed on a porous substrate is carbonized and $O_2/N_2$ separation performance of the formed carbon film laminate. Table 3 also shows percent shrinkage of the corresponding self-standing resin film (polyimide resin alone film) during carbonization under the same conditions. When carbonization was performed so as to attain percent shrinkage of 3 to 4%, $O_2/N_2$ separation factor was found to be 5. Similarly, in the case of a percent shrinkage of 5.5 to 6.5, $O_2/N_2$ separation factor was 4. In the case of a percent shrinkage of 7 to 9, $O_2/N_2$ separation factor was 3. In the case of a percent shrinkage of 13.5%, $O_2/N_2$ separation factor was 2. In the case of a percent shrinkage of 15% or higher, no $O_2/N_2$ separation performance was attained.

Table 4 shows the relationship between carbonization conditions under which a polyimide resin layer formed on a porous substrate is carbonized and $CO_2/CH_4$ separation performance of the formed carbon film laminate. Table 4 also shows percent shrinkage of the corresponding self-standing resin film (polyimide resin alone film) during carbonization under the same conditions. When carbonization was performed so as to attain percent shrinkage of 6.5%, $CO_2/CH_4$ separation factor was found to be 50. Similarly, in the case of a percent shrinkage of 9.0%, $CO_2/CH_4$ separation factor was 15. In the case of a percent shrinkage of 13.5%, $CO_2/CH_4$ separation factor was 5.

The above $O_2/N_2$ separation and $CO_2/CH_4$ separation tests have revealed that, when a self-standing resin film exhibits a small percent shrinkage, separation factor increases, whereas when the percent shrinkage is larger, separation factor decreases. $CO_2/CH_4$ separation factor is generally larger than $O_2/N_2$ separation factor, since the difference in molecular size between $CO_2$ and $CH_4$ is greater than that between $O_2$ and $N_2$. Separation factor of carbon film laminate; i.e., pore size of a carbon film formed on a porous substrate, can be controlled through tuning of percent shrinkage of the corresponding self-standing resin film. For example, when thermal treatment is performed so as to attain a percent shrinkage of 3 to 15%, the formed carbon film laminate can perform separation of gas molecules having a molecular size of 0.3 to 0.4 nm.

(Relationship between Separation Performance and Percent Shrinkage of Self-standing Carbon Film)

Table 5 shows the relationship between carbonization conditions under which a self-standing carbon film (polyimide resin alone film) is carbonized and $O_2/N_2$ separation performance of the formed carbon film laminate. Table 5 also shows percent shrinkage of the self-standing resin film (polyimide resin alone film) during carbonization under the same conditions. Differing from the aforementioned case of carbon film laminates, $O_2/N_2$ separation performance of self-standing carbon film did not depend on carbonization conditions and percent shrinkage, and fell within a range of 4 to 5. This indicates that the pore size of the self-standing carbon film produced at a carbonization temperature of 480 to 520° C. for a carbonization time of 0.25 to 6 hours does not depend on percent shrinkage. Difference in separation factor between carbon film formed on a porous substrate (carbon film laminate) and self-standing carbon film indicates that pore size of the carbon film formed on a porous substrate varies in response to tensile stress received from the substrate.

(Air/VOC Separation Performance)

Table 6 shows the relationship between carbonization conditions under which a polyimide resin layer formed on a porous substrate is carbonized and air/xylene separation performance of the formed carbon film laminate. Table 6 also shows percent shrinkage of the self-standing resin film (polyimide resin alone film) during carbonization under the same conditions. Since permeation factors with respect to o-xylene, m-xylene, and p-xylene were equivalent, permeation factor with respect to p-xylene is shown, as a typical example, in Table 6. As shown in Table 3, samples of Examples 18 and 19 exhibit an $O_2/N_2$ separation factor of 1. That is, permeation degree of oxygen and nitrogen are equivalent. When carbonization was performed so as to attain a percent shrinkage of 15 to 35%, a carbon film laminate exhibiting a air/xylene separation performance and high air permeation factor was produced. In contrast, a self-standing carbon film produced through carbonizing a self-standing resin film (polyimide resin alone film) under the same conditions as employed in Table 6 exhibited permeation factors with respect to oxygen and nitrogen below the gas chromatographic detection limit. Difference in permeation factor between carbon film formed on a porous substrate (carbon film laminate) and self-standing carbon film indicates that pore size of the carbon film formed on a porous substrate varies in response to tensile stress received from the substrate.

second mode, which is another aspect of the invention, is suitably employed for reducing VOC concentration of air containing the VOC.

The invention claimed is:

1. A carbon film laminate having a porous substrate formed of a plurality of particles and a carbon film provided on a surface of the porous substrate,
    wherein the porous substrate comprises a surface layer which is in contact with the carbon film and which is formed of particles having a mean particle size of 0.02 to 0.11 µm, and a mean pore size of 0.01 to 0.05 µm, and a porous body formed of particles having a mean particle size differing from that of the particles forming the surface layer.

2. A carbon film laminate as described in claim 1, wherein the surface layer of the porous substrate has a thickness of 0.5 to 2.5 µm.

3. A carbon film laminate as described in claim 1, wherein the carbon film has a thickness of 0.1 to 5 µm.

4. A carbon film laminate as described in claim 1, wherein the particles forming the porous substrate are ceramic particles.

5. A carbon film laminate as described in claim 1, wherein the particles forming the surface layer of the porous substrate contain titania particles.

6. A carbon film laminate as described in claim 1, wherein the particles forming the surface layer of the porous substrate contain zirconia particles.

7. A carbon film laminate as described in claim 1, which is able to perform oxygen/nitrogen separation of a gas containing oxygen and nitrogen.

TABLE 6

| Ex. | Carbonization temperature [° C.] | Carbonization time [hour] | Percent shrinkage [%] | Air/xylene separation factor | Air permeation factor [mol · m · s⁻¹ · Pa⁻¹ · m⁻²] |
|---|---|---|---|---|---|
| 18 | 600 | 6 | 15 | 6.5 | $9.0 \times 10^{-13}$ |
| 19 | 700 | 6 | 30 | 5 | $1.2 \times 10^{-12}$ |

INDUSTRIAL APPLICABILITY

As described hereinabove, according to the first mode of the carbon film laminate of the present invention, oxygen/nitrogen separation of a gas containing oxygen and nitrogen as well as removal of VOC from air containing the VOC can be attained. Through employment of the carbon film laminate, oxygen enrichment of air and effective cleaning of air contaminated by VOC can be performed. In addition, the carbon film laminate which can perform oxygen/nitrogen separation can also be employed for separation of other gas mixtures; e.g., $CO_2/CH_4$ separation of a gas containing carbon dioxide and methane.

According to the second mode of the method for producing a carbon film laminate of the present invention, the pore size of the carbon film can be controlled to be a predetermined size. Thus, the method is suitably employed for producing a carbon film laminate including a carbon film having a predetermined pore size. The second mode of the carbon film laminate of the present invention is suitably employed for separating oxygen from air. The carbon film laminate of the 8. A carbon film laminate as described in claim 1, which allows a volatile organic compound (VOC) to be separated from air containing the VOC.

9. A method for producing a carbon film laminate comprising
    providing a surface layer on a surface of a porous body formed of a plurality of particles, the surface layer being formed of particles having a mean particle size of 0.01 to 0.11 µm and having a mean particle size differing from that of the particles forming the porous body, to thereby form a porous substrate having a porous body and a surface layer;
    providing a polyimide resin layer on the surface layer of the porous substrate, to thereby form a polyimide resin layer-provided porous substrate; and
    thermally treating the polyimide resin layer-provided porous substrate so as to carbonize polyimide resin, to thereby form a carbon film laminate.

10. A method for producing a carbon film laminate as described in claim 9, wherein the polyimide resin layer-provided porous substrate is thermally treated in a non-oxidizing atmosphere at 460 to 800° C.

11. A method for producing a carbon film laminate as described in claim 9, the carbon film laminate being able to perform oxygen/nitrogen separation of a gas containing oxygen and nitrogen, wherein the polyimide resin layer-provided porous substrate is thermally treated in a non-oxidizing atmosphere at 460 to 550° C.

12. A method for producing a carbon film laminate as described in claim 9, the carbon film laminate allowing a volatile organic compound (VOC) to be separated from air containing the VOC, wherein the polyimide resin layer-provided porous substrate is thermally treated in a non-oxidizing atmosphere at 550 to 800° C.

13. A method for producing a carbon film laminate comprising a step of thermally treating a polyimide resin layer-provided porous substrate having a porous substrate and a polyimide resin layer formed on the porous substrate, to thereby carbonize polyimide resin to form a carbon film, wherein the polyimide resin layer-provided porous substrate is thermally treated under such thermal treatment conditions that percent shrinkage of the polyimide resin after initiation of shrinkage is adjusted to a predetermined value on the basis of the relationship between percent shrinkage of the polyimide resin per se as determined after initiation of shrinkage during thermal treatment of the resin and thermal treatment conditions therefor, whereby the carbon film has a controlled pore size.

14. A method for producing a carbon film laminate as described in claim 13, wherein thermal treatment is performed under such conditions that percent shrinkage is controlled to 3 to 15%.

15. A method for producing a carbon film laminate as described in claim 13, wherein thermal treatment is performed under such conditions that percent shrinkage is controlled to 15 to 35%.

16. A carbon film laminate which is produced through a production method as described in claim 14 and which enables separation of gas molecules having a molecular diameter of 0.3 to 0.4 nm.

17. A carbon film laminate as described in claim 16, which is able to perform nitrogen molecule/oxygen molecule separation.

18. A carbon film laminate as described in claim 17, which attains a nitrogen molecule/oxygen molecule separation factor of 1.5 or more.

19. A carbon film laminate which is produced through a production method as described in claim 15 and which enables separation of gas molecules having a molecular diameter of 0.4 nm or less and those having a molecular diameter more than 0.4 mm.

20. A carbon film laminate as described in claim 19, which allows a volatile organic compound (VOC) to be separated from air containing the VOC.

21. A VOC removal apparatus for taking in air flow containing a volatile organic compound (VOC) and for discharging air flow having a reduced VOC concentration, which apparatus comprises a carbon film laminate as recited in claim 8, the carbon film laminate being provided for separating air containing the VOC into air having an increased VOC concentration (high-VOC air) and air having a reduced VOC concentration, and a refrigerating apparatus for liquefying the VOC present in the high-VOC air.

22. A VOC storing method for storing a volatile organic compound, which method comprises employing a VOC storing apparatus having a container (storage container) for storing the VOC, a gas pipe for bringing the storage container into communication with outside air, and a carbon film laminate as recited in claim 8, the laminate being placed in the gas pipe, and storing the VOC in the storage container, while the VOC concentration of the gas discharged through the gas pipe from the storage container is reduced.

* * * * *